US012696140B2

(12) United States Patent     (10) Patent No.:   US 12,696,140 B2

Karapantelakis et al.          (45) Date of Patent:     Jul. 28, 2026

(54) METHOD FOR MANAGING QoS IN A COMMUNICATIONS NETWORK USING A MACHINE LEARNING

(71) Applicant: Telefonaktiebolaget LM Ericsson (publ), Stockholm (SE)

(72) Inventors: Athanasios Karapantelakis, Solna (SE); Maxim Teslenko, Sollentuna (SE); Jörg Niemöller, Sollentuna (SE); Lackis Eleftheriadis, Valbo (SE); Shah Nawak Khan, Stockholm (SE); Karthik R M, Chennai (IN); Amin Azari, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 18/282,067

(22) PCT Filed: Mar. 18, 2021

(86) PCT No.: PCT/SE2021/050240
§ 371 (c)(1),
(2) Date: Sep. 14, 2023

(87) PCT Pub. No.: WO2022/197225
PCT Pub. Date: Sep. 22, 2022

(65) Prior Publication Data
US 2024/0155435 A1     May 9, 2024

(51) Int. Cl.
*H04W 28/24*     (2009.01)
(52) U.S. Cl.
CPC ................................. *H04W 28/24* (2013.01)
(58) Field of Classification Search
CPC ....... H04W 28/24; H04W 24/02; G06N 20/00
See application file for complete search history.

(56) References Cited

U.S. PATENT DOCUMENTS

| | | | |
|---|---|---|---|
| 2020/0213949 A1 | 7/2020 | Bria et al. | |
| 2022/0141703 A1* | 5/2022 | Dhammawat | H04W 76/12 |
| | | | 370/328 |
| 2023/0108693 A1* | 4/2023 | Cao | H04W 72/543 |

FOREIGN PATENT DOCUMENTS

| | | |
|---|---|---|
| EP | 3742767 A1 | 11/2020 |
| EP | 3751536 A1 | 12/2020 |
| WO | 2015103523 A1 | 7/2015 |

OTHER PUBLICATIONS

International Search Report and Written Opinion of the International Searching Authority, PCT/SE2021/050240, mailed Dec. 6, 2021, 13 pages.

(Continued)

*Primary Examiner* — Jung H Park
(74) *Attorney, Agent, or Firm* — Sage Patent Group

(57) ABSTRACT

A computer implemented method for managing QoS of wireless devices in a communication network is disclosed. The method includes receiving a QoS intent from a first node, the QoS intent including an identification of a wireless device to which the QoS intent applies and a QoS requirement for the identified wireless device. The method further includes obtaining a specification of available QoS in the communication network and a specification of QoS policies in the communication network, using an ML model to determine, based on the received QoS intent and obtained specifications, at what time the at least one QoS requirement of the QoS intent can be fulfilled for the identified wireless device, and informing the first node of a result of the determination. Also disclosed is a QoS management node.

19 Claims, 19 Drawing Sheets

(56)  References Cited

OTHER PUBLICATIONS

OPENCELLID, Maintained by Unwired Labs; Accessed on the Internet on Sep. 9, 2023 as: https://www.opencellid.org/#zoom=16 &lat=37.77889&Ion=-122.41942; 3 pages.

* cited by examiner

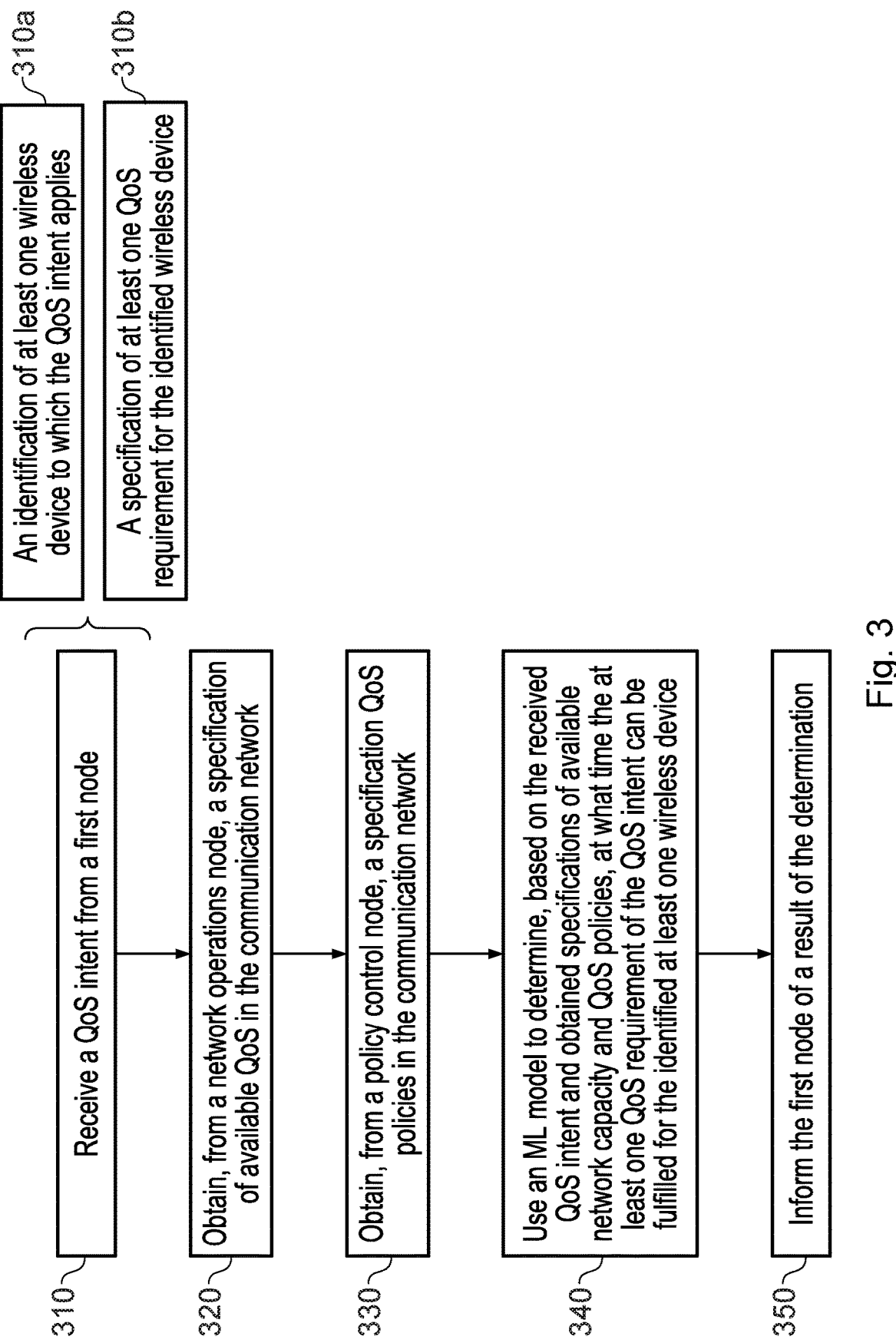

310a — An identification of at least one wireless device to which the QoS intent applies 310b — A specification of at least one QoS requirement for the identified wireless device 310 — Receive a QoS intent from a first node 320 — Obtain, from a network operations node, a specification of available QoS in the communication network 330 — Obtain, from a policy control node, a specification QoS policies in the communication network 340 — Use an ML model to determine, based on the received QoS intent and obtained specifications of available network capacity and QoS policies, at what time the at least one QoS requirement of the QoS intent can be fulfilled for the identified at least one wireless device 350 — Inform the first node of a result of the determination

Fig. 3

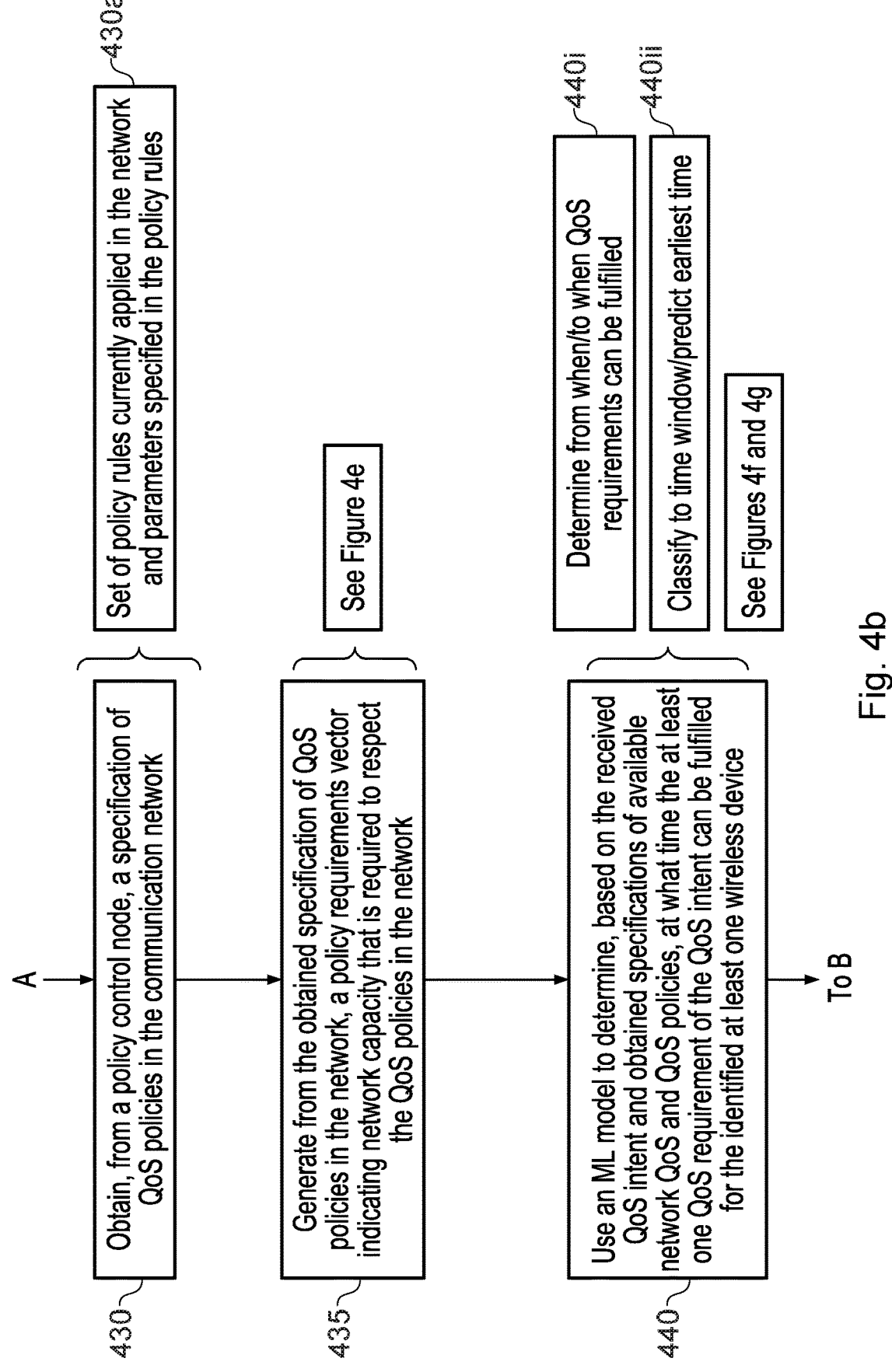

430

Obtain, from a policy control node, a specification of QoS policies in the communication network 430a — Set of policy rules currently applied in the network and parameters specified in the policy rules

435

Generate from the obtained specification of QoS policies in the network, a policy requirements vector indicating network capacity that is required to respect the QoS policies in the network See Figure 4e

440

Use an ML model to determine, based on the received QoS intent and obtained specifications of available network QoS and QoS policies, at what time the at least one QoS requirement of the QoS intent can be fulfilled for the identified at least one wireless device 440i — Determine from when/to when QoS requirements can be fulfilled 440ii — Classify to time window/predict earliest time See Figures 4f and 4g

Fig. 4b

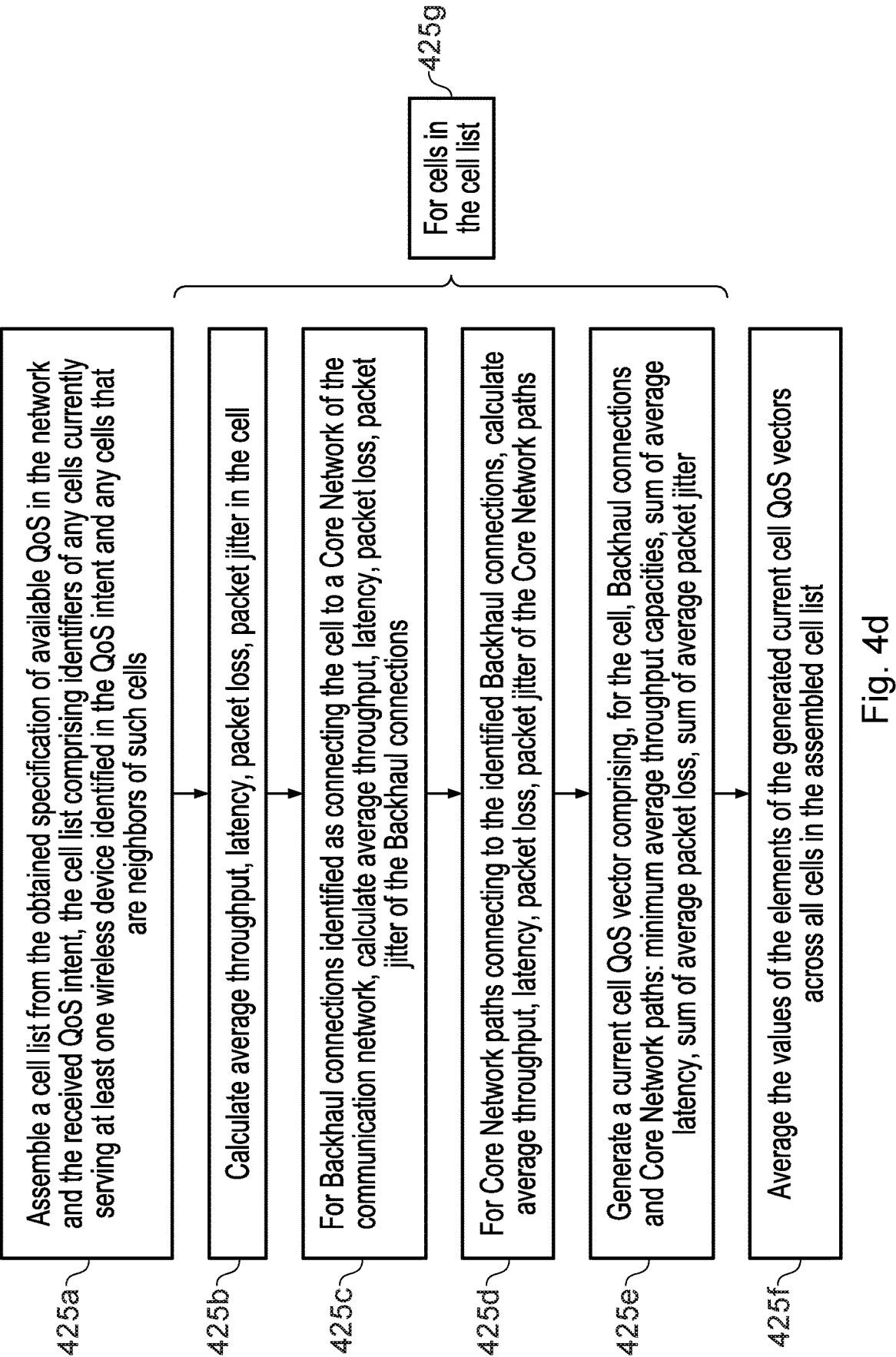

425g — For cells in the cell list

425a — Assemble a cell list from the obtained specification of available QoS in the network and the received QoS intent, the cell list comprising identifiers of any cells currently serving at least one wireless device identified in the QoS intent and any cells that are neighbors of such cells 425b — Calculate average throughput, latency, packet loss, packet jitter in the cell 425c — For Backhaul connections identified as connecting the cell to a Core Network of the communication network, calculate average throughput, latency, packet loss, packet jitter of the Backhaul connections 425d — For Core Network paths connecting to the identified Backhaul connections, calculate average throughput, latency, packet loss, packet jitter of the Core Network paths 425e — Generate a current cell QoS vector comprising, for the cell, Backhaul connections and Core Network paths: minimum average throughput capacities, sum of average latency, sum of average packet loss, sum of average packet jitter 425f — Average the values of the elements of the generated current cell QoS vectors across all cells in the assembled cell list

Fig. 4d

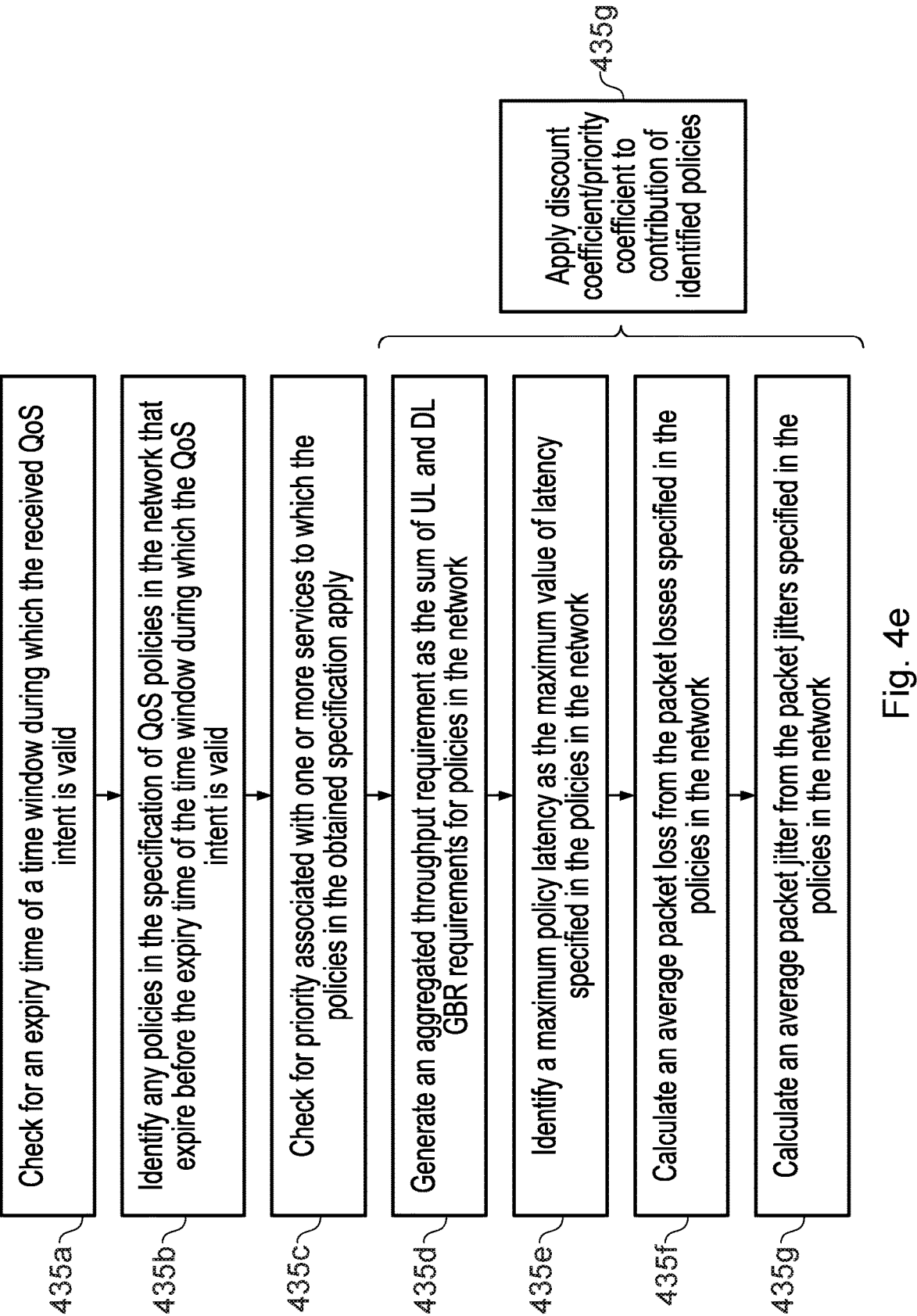

435a — Check for an expiry time of a time window during which the received QoS intent is valid 435b — Identify any policies in the specification of QoS policies in the network that expire before the expiry time of the time window during which the QoS intent is valid 435c — Check for priority associated with one or more services to which the policies in the obtained specification apply 435d — Generate an aggregated throughput requirement as the sum of UL and DL GBR requirements for policies in the network 435e — Identify a maximum policy latency as the maximum value of latency specified in the policies in the network 435f — Calculate an average packet loss from the packet losses specified in the policies in the network 435g — Calculate an average packet jitter from the packet jitters specified in the policies in the network 435g — Apply discount coefficient/priority coefficient to contribution of identified policies

Fig. 4e

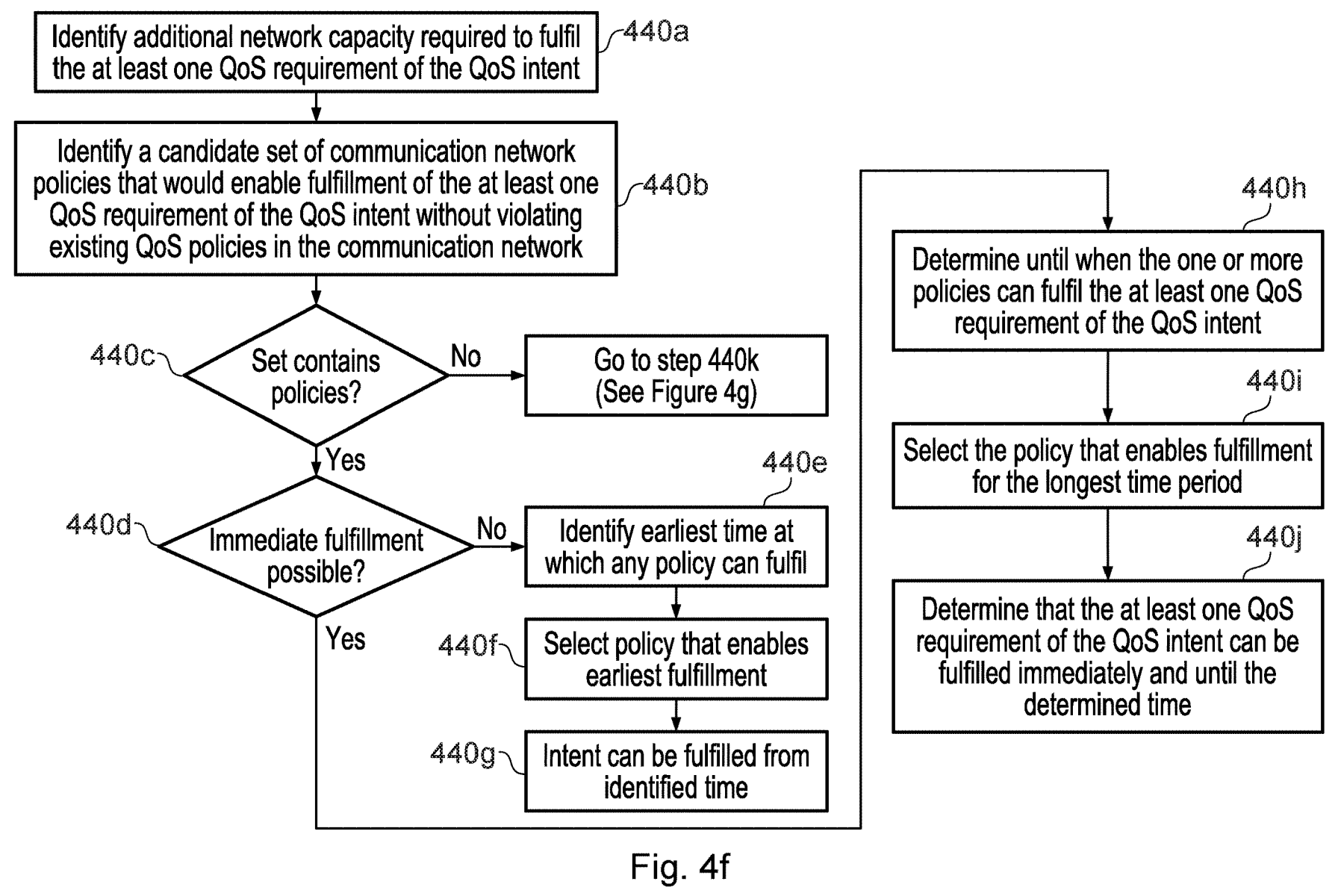

440h — Determine until when the one or more policies can fulfil the at least one QoS requirement of the QoS intent 440i — Select the policy that enables fulfillment for the longest time period 440j — Determine that the at least one QoS requirement of the QoS intent can be fulfilled immediately and until the determined time 440a — Identify additional network capacity required to fulfil the at least one QoS requirement of the QoS intent 440b — Identify a candidate set of communication network policies that would enable fulfillment of the at least one QoS requirement of the QoS intent without violating existing QoS policies in the communication network 440c — Set contains policies?

No → Go to step 440k (See Figure 4g)

Yes

440d — Immediate fulfillment possible?

No → 440e — Identify earliest time at which any policy can fulfil

440f — Select policy that enables earliest fulfillment

440g — Intent can be fulfilled from identified time

Yes

Fig. 4f

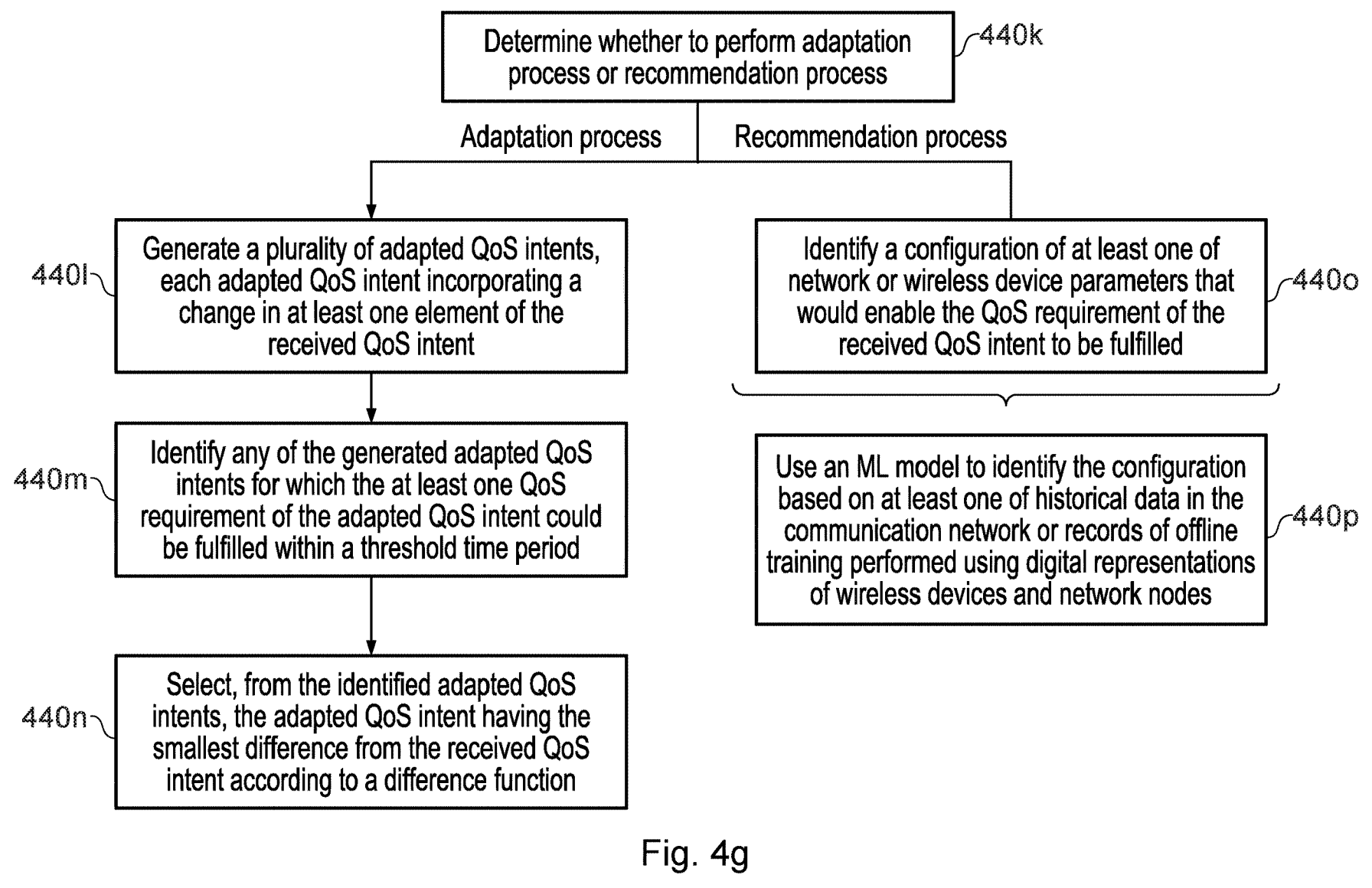

Determine whether to perform adaptation process or recommendation process — 440k Recommendation process Identify a configuration of at least one of network or wireless device parameters that would enable the QoS requirement of the received QoS intent to be fulfilled — 440o Use an ML model to identify the configuration based on at least one of historical data in the communication network or records of offline training performed using digital representations of wireless devices and network nodes — 440p Adaptation process Generate a plurality of adapted QoS intents, each adapted QoS intent incorporating a change in at least one element of the received QoS intent — 440l Identify any of the generated adapted QoS intents for which the at least one QoS requirement of the adapted QoS intent could be fulfilled within a threshold time period — 440m Select, from the identified adapted QoS intents, the adapted QoS intent having the smallest difference from the received QoS intent according to a difference function — 440n

Fig. 4g

QoS Intent Handling in 3GPP Mobile Networks

Incumbent Policy Rules in PCRF (Excerpt)

| Policy Number | Policy Rule Name | SDF Template | SDF GBR | SDF QCI/ARP | QCI Params | | | | | Expiration Date |
|---|---|---|---|---|---|---|---|---|---|---|
| | | | | | Resource Type | Priority | Packet Delay Budget | Packet Error Loss Rate | | |
| | | | | | Guaranteed Bit Rate (GBR) | | | | | |
| 1 | Autonomous Car Video Streaming | UL:(UE IP,*,,RTP,*,,UDP) DL:(*,UE IP,SIP,*,,UDP) | UL: 1024 Mbps DL: 10 Kbps | QCI = 1 ARP = 2 | | 2 | 100 ms | 0.01 | | 2021-10-09 11:32 |
| 2 | Autonomous Car Control Signalling | UL:(UE IP,*,,,TCP) DL:(*,UE IP,,,TCP) | UL: 10 Kbps DL: 10 Kbps | QCI = 69 ARP = 1 | | 0.5 | 60 ms | 0.000001 | | - (indefinite) |
| 3 | Remote Robot Operation | UL:(UE IP,*,,*,TCP) DL:(*,UE IP,*,,TCP) | UL: 400 Kbps DL: 350 Kbps | QCI = 82 ARP = 4 | | 1.9 | 10 ms | 0.0001 | | 2021-09-08 09:00 |

Fig. 9

RAN Capacity Information at time T (with a window of T - 5 sec)

| CellID | Throughput | Bandwidth | UE List | Avg. Loss | Latency | Timestamp |
|---|---|---|---|---|---|---|
| 123 | 54 Mbps UL/ 43 Mbps DL | 150 Mbps UL/ 100 Mbps DL | {2,3,6..} | 0.0001 | 101 ms | T - 5 sec |
| 497 | 47 Mbps UL/ 41 Mbps DL | 150 Mbps UL/ 100 Mbps DL | {1,11,36,.} | 0.00031 | 45 ms | T - 4.98 sec |
| 5447 | 12 Mbps UL/ 23 Mbps DL | 150 Mbps UL/ 100 Mbps DL | {12,13,.} | 0.00201 | 99 ms | T - 4.76 sec |
| 6546 | 41 Mbps UL/ 77 Mbps DL | 150 Mbps UL/ 100 Mbps DL | {72,96,.} | 0.0011 | 35 ms | T - 4.72 sec |
| --- | | | | | | |
| 45857 | 97 Mbps UL/ 65 Mbps DL | 150 Mbps UL/ 100 Mbps DL | {22,34,.} | 0.000101 | 541 ms | T - 0.12 sec |

Backhaul (BK) Capacity Information at time T (with a window of T- 5 sec)

| BK ID | Cell ID List | Throughput | Bandwidth | Avg. Loss | Latency | Timestamp |
|---|---|---|---|---|---|---|
| 1 | {123,12, 312,..} | 454 Mbps UL/ 542 Mbps DL | 500 Mbps UL/ 450 Mbps DL | 0.0001 | 5 ms | T - 5 sec |
| 15 | {497,5447, 45421,.} | 542 Mbps UL/ 204 Mbps DL | 500 Mbps UL/ 450 Mbps DL | 0.0001 | 4 ms | T - 4.99 sec |
| 12 | {321,121, 379,..} | 345 Mbps UL/ 756 Mbps DL | 900 Mbps UL/ 850 Mbps DL | 0.0001 | 5 ms | T - 4.87 sec |
| 3 | {981,156,.} | 970 Mbps UL/ 777 Mbps DL | 750 Mbps UL/ 750 Mbps DL | 0.0001 | 4 ms | T - 4.81 sec |
| --- | | | | | | |
| 16 | {541.321,.} | 244 Mbps UL/ 242 Mbps DL | 600 Mbps UL/ 600 Mbps DL | 0.0001 | 5 ms | T – 0.02 sec |

Fig. 10

Core N/W User Plane Capacity from SGW to PGW at time T (with a window of T - 5 sec)

| Path ID | BK ID List | Throughput | Bandwidth | Avg. Loss | Latency | Timestamp |
|---|---|---|---|---|---|---|
| 1 | {1,2,5,..} | 121 Mbps UL/ 321 Mbps DL | 11 Gbps UL/ 11 Gbps DL | 0.0001 | 2 ms | T - 5 sec |
| 4 | {3,11,12,..} | 121 Mbps UL/ 321 Mbps DL | 11 Gbps UL/ 11 Gbps DL | 0.0001 | 2 ms | T - 4.23 sec |
| 3 | {14,12, 51,..} | 121 Mbps UL/ 321 Mbps DL | 11 Gbps UL/ 11 Gbps DL | 0.0001 | 2 ms | T - 4.1 sec |
| --- | | | | | | |
| 7 | {13,45, 15,..} | 121 Mbps UL/ 184 Mbps DL | 11 Gbps UL/ 11 Gbps DL | 0.0001 | 2 ms | T - 0.01 sec |

Fig. 10 (Continued)

QoS Intent Payload Feature Vector

| | |
|---|---|
| f1=List of UEs | {1, 4, 6, 87, 543, ...} |
| f2=GBR | true |
| f3=UL ceiling per device | 545 mbps |
| f4=DL ceiling per device | 445 mbps |
| f5=Latency per device | 10 ms |
| f6=Packet Drops | 0.001 |
| f7=Expiration Date | indefinite |

Fig. 11

METHOD FOR MANAGING QoS IN A COMMUNICATIONS NETWORK USING A MACHINE LEARNING

CROSS REFERENCE TO RELATED APPLICATIONS

This application is a 35 U.S.C. § 371 national stage application of PCT International Application No. PCT/SE2021/050240 filed on Mar. 18, 2021, the disclosure and content of which is incorporated by reference herein in its entirety.

TECHNICAL FIELD

The present disclosure relates to a method for managing Quality of Service (QoS) of wireless devices in a communication network. The present disclosure also relates to a management node and to a computer program and a computer program product configured, when run on a computer to carry out a method for managing QoS of wireless devices in a communication network.

BACKGROUND

Quality of Service (QoS) is an important aspect of communication networks such as $4^{th}$ and $5^{th}$ generation (4G and 5G) 3GPP communication networks. QoS is particularly important for enterprise services and applications, which frequently impose strict requirements on the network infrastructure, for example in terms of latency ceiling, high-availability, low-latency, etc. FIG. 1 illustrates QoS management in 4G and 5G networks. In 4G networks, the QoS mechanism is based on Evolved Packet switched System (EPS) bearers, which are transmission paths from the radio access network to the operator's core network. Bearers can be parameterized by so-called QoS Class Identifiers (QCI), with parameters including relative priority, packet delay budget (latency ceiling), packet error loss rate and guaranteed bit rate. The Policy Charging and Rules Function (PCRF) node is responsible for cataloguing these policies in Policy Control and Charging (PCC) rules, which rules are then enforced from different nodes in the mobile network. A third party such as an enterprise, referred to as an "Application Server" (AS), is able to dynamically control QoS using the DIAMETER Rx interface towards the PCRF node. In 5G networks, instead of bearers, QoS is enforced at QoS flow level, parameterized by QoS flow identifiers (QFIs). Unlike 4G, in which one radio bearer is mapped to one EPS bearer, in 5G it is possible to decouple QoS flows from radio bearers, allowing for example to have two bearers as illustrated in FIG. 1. This allows for more granular management of radio access resources. As in 4G, a third party is able to control QoS in a 5G network through interaction with a Policy Control Function (PCF) node. A 5G interface exists, similar to the DIAMETER/Rx interface, for creation of policy rules between a third party "Application Function" (AF) and a PCF node.

One of the challenges for QoS control in 4G and 5G networks is that the third party AS or AF needs to know internal configuration details of how the PCC rules are structured in order to request QoS changes. This is owing to the significant amount of network-level configuration information contained in DIAMETER messages. In order for third parties to be able to communicate at an abstraction level with which they are comfortable, and to receive feedback on their QoS modification requests, 3GPP introduced exposure functions in mobile networks, specifically the Service Capability Exposure Function (SCEF) in 4G, and the Network Exposure Function (NEF) in 5G.

FIG. 2 illustrates QoS request and PCC Rule enforcement in a PCR/PCEF node from a third party AS in a 4G network. It will be appreciated that a similar process exists in 5G. The AS may provide enterprise domain parameters in the on-demand QoS request, which are then mapped to network parameters in the SCEF node as illustrated. In addition to QoS change requests, the 4G and 5G exposure functions SCEF and NEF feature a publish-subscribe type interface through which a third party can subscribe to certain events, receiving asynchronous notifications of status changes for the subscribed events. For example, a third party could monitor a UE or UE group state, including whether or not a UE is roaming, is reachable for data, SMS, etc. Through this interface a third party can monitor not only the success of a QoS change request, but also the effect a change request has on operation of a UE.

One issue with the current setup of QoS management in 4G and 5G mobile networks is with the immediate feedback provided based on the existing resource situation and/or preferences of the mobile network operator. If the network has enough resources to fulfill the QoS request, it will respond that it can fulfill the QoS request and will create the policy rules in PCRF (4G) or PCF (5G) node. If the network does not have enough resources, it will either ignore this fact and still establish the policy rules, which could lead to subpar performance for affected UEs and also for other UEs in the network, or the network will deny the QoS request. Consequently, the only way for a third party to determine whether its QoS requests are fulfilled is to send appropriate monitoring requests so as to determine, based on performance of its UEs, whether or not the relevant policy rules have been created and applied. This lack of transparency in QoS management, the associated monitoring burden for customers, and the systemic effects produced by an "accept all" policy towards QoS requests, can lead to customer dissatisfaction and consequent customer churn

SUMMARY

It is an aim of the present disclosure to provide a QoS management node, method performed by a QoS management node, and a computer readable medium which at least partially address one or more of the challenges discussed above. It is a further aim of the present disclosure to provide a QoS management node, computer readable medium and associated method which provide increased flexibility and transparency in the handling of QoS requests.

According to a first aspect of the present disclosure, there is provided a computer implemented method for managing Quality of Service (QoS) of wireless devices in a communication network. The method, performed by a QoS management node, comprises receiving a QoS intent from a first node, the QoS intent comprising an identification of at least one wireless device to which the QoS intent applies and a specification of at least one QoS requirement for the identified wireless device. The method further comprises obtaining, from a network operations node, a specification of available QoS in the communication network, and obtaining, from a policy control node, a specification of QoS policies in the communication network. The method further comprises using a Machine Learning (ML) model to determine, based on the received QoS intent and obtained specifications of available network QoS and QoS policies, at what time the at least one QoS requirement of the QoS intent can be fulfilled for the identified at least one wireless device, and informing the first node of a result of the determination.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of aspects or examples of the present disclosure.

According to another aspect of the present disclosure, there is provided a QoS management node for managing QoS of wireless devices in a communication network. The QoS management node comprises processing circuitry configured to cause the QoS management node to receive a QoS intent from a first node, the QoS intent comprising an identification of at least one wireless device to which the QoS intent applies and a specification of at least one QoS requirement for the identified wireless device. The processing circuitry is configured to cause the QoS management node to obtain, from a network operations node, a specification of available QoS in the communication network, and to obtain, from a policy control node, a specification of QoS policies in the communication network. The processing circuitry is further configured to cause the QoS management node to use a Machine Learning (ML) model to determine, based on the received QoS intent and obtained specifications of available network QoS and QoS policies, at what time the at least one QoS requirement of the QoS intent can be fulfilled for the identified at least one wireless device, and to inform the first node of a result of the determination.

According to another aspect of the present disclosure, there is provided a management node for managing QoS of wireless devices in a communication network. The QoS management node comprises a receiving module for receiving a QoS intent from a first node, the QoS intent comprising an identification of at least one wireless device to which the QoS intent applies and a specification of at least one QoS requirement for the identified wireless device. The QoS management node further comprises an obtaining module for obtaining, from a network operations node, a specification of available QoS in the communication network, and for obtaining, from a policy control node, a specification of QoS policies in the communication network. The QoS management node further comprises an ML model module for using an ML model to determine, based on the received QoS intent and obtained specifications of available network QoS and QoS policies, at what time the at least one QoS requirement of the QoS intent can be fulfilled for the identified at least one wireless device. The QoS management node further comprises a transmitting module for informing the first node of a result of the determination.

Examples of the present disclosure provide a method and a QoS management node that enable a more flexible and transparent management of QoS for wireless devices in a communication network. On receipt of a QoS intent concerning one or more wireless devices, a determination is made, based on information about current network QoS and policy rules, to predict at what time the QoS intent may be fulfilled or satisfied by the network. Information may be provided to the originator of the QoS intent regarding from when/until when the QoS intent can be fulfilled, and/or including suggestions for changes in the QoS intent or in other network or device parameters that would enable the QoS intent to be fulfilled. Examples of the present disclosure thus represent an intent-driven, cognitive approach to the challenge of managing QoS in communication networks, and offer increased flexibility and transparency for wireless device owners.

BRIEF DESCRIPTION OF THE DRAWINGS

For a better understanding of the present disclosure, and to show more clearly how it may be carried into effect, reference will now be made, by way of example, to the following drawings in which:

FIG. 3 is a flow chart illustrating process steps in a computer implemented method for managing QoS of wireless devices in a communication network;

FIGS. 4a to 4g show flow charts illustrating process steps in another example of computer implemented method for managing QoS of wireless devices in a communication network;

FIG. 9 illustrates an example specification of QoS policies in a communication network;

FIG. 10 illustrates an example specification of available QoS in a communication network;

FIG. 11 illustrates an example QoS intent; and

DETAILED DESCRIPTION

Figure 1:
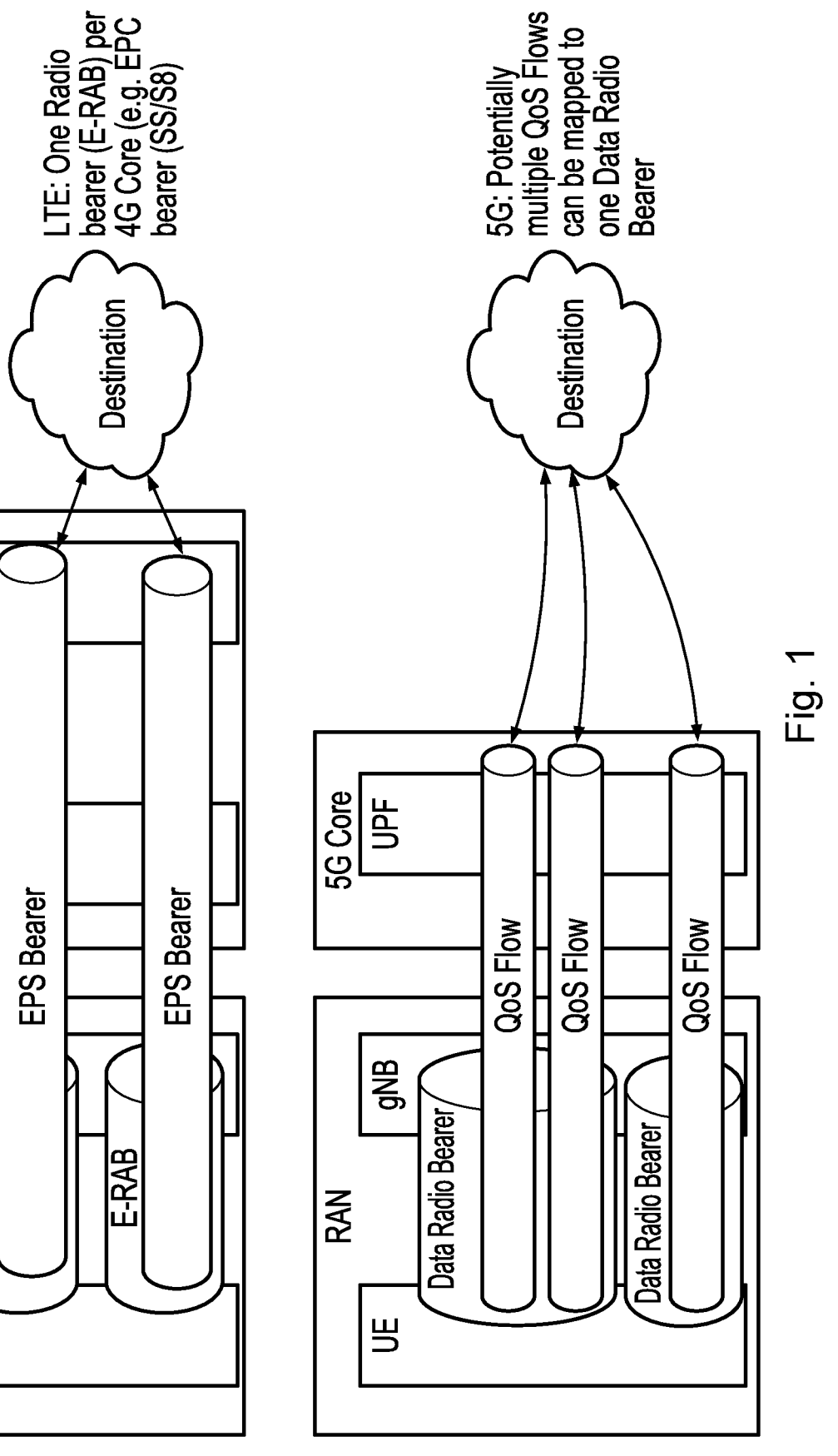
FIG. 1 illustrates QoS management in 4G and 5G networks.
Figure 2:
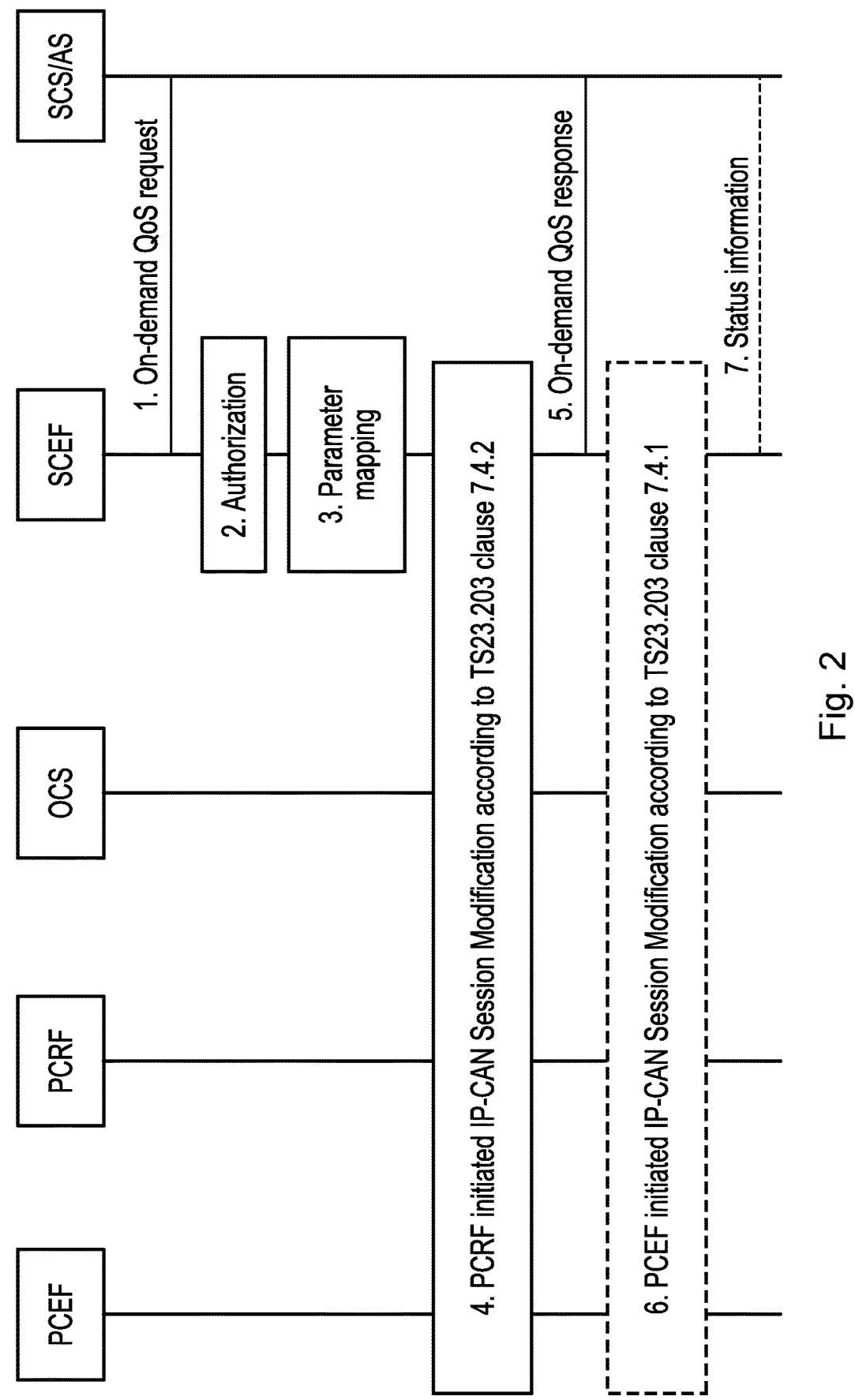
FIG. 2 illustrates QoS request and PCC Rule enforcement in a 4G network.

Examples of the present disclosure propose to address QoS management via the provision of QoS intents, which set out expectations for QoS handling of wireless devices, and may be handled in a more flexible and transparent manner than is possible under existing systems for 4G and 5G networks. According to examples of the present disclosure, on receipt of a QoS intent concerning at least one wireless device, a QoS management node may determine a time at which it will be able to fulfil the expectations contained in the QoS intent. This time may vary from immediately to sometime in the future to effectively "never", i.e. not within a time frame that the QoS management node is able to predict. In the event of a resource shortage meaning the full QoS intent cannot be satisfied, the QoS management node may, according to different examples of the present disclosure, partially fulfill the QoS intent, predict at what future time it will be possible to completely fulfill the QoS intent, suggest changes, in the QoS intent or elsewhere, that would enable the QoS intent to be fulfilled, and/or predict until when fulfilment of the QoS intent can be assured. In all of these different circumstances, the party issuing the QoS intent may be informed by the QoS management node, avoiding the need for follow up monitoring and offering the possibility of a QoS negotiation to align network resource usage with customer priorities.

FIG. 3 is a flow chart illustrating process steps in a computer implemented method 300 for managing Quality of Service (QoS) of wireless devices in a communication network. The method is performed by a QoS management node which may comprise a physical or virtual node, and may be implemented in a server apparatus and/or in a virtualized environment, for example in a cloud or fog deployment. The QoS management node may for example be implemented in a core network of the communication network, and may in some examples encompass multiple logical entities. In some examples, the QoS management node may be a logically distinct function that is co-located with another node, or may be a separate physical node. In the case of co-location, the QoS management node may be co-located with an exposure function, such as the SCEF (4G) or NEF (5G).

Referring to FIG. 3, in a first step 310, the method 300 comprises receiving a QoS intent from a first node. As illustrated at 310a and 310b, the QoS intent comprises an identification of at least one wireless device to which the QoS intent applies, and a specification of at least one QoS requirement for the identified wireless device. The one or more QoS requirements that comprise the QoS intent set out the expectations of the first node regarding QoS for the identified wireless device or devices. The QoS intent thus defines at a first, relatively high level of abstraction a level of QoS that is required for the identified wireless device or devices, and the individual QoS requirements in the QoS intent set out at a second or lower level of abstraction the specific expectations in terms of QoS that should be met in order to fulfil the QoS intent.

In step 320, the method 300 comprises obtaining, from a network operations node, a specification of available QoS in the communication network. The available QoS may set out the capability of the network to meet certain QoS requirements with respect to established QoS parameters. In step 330, the method 300 comprises obtaining, from a policy control node, a specification of QoS policies in the communication network. This may comprise QoS policies that have already been established and are being enforced in the network and/or policies that the network knows it will need to implement based on previous experience. In step 340, the method 300 comprises using a Machine Learning (ML) model to determine, based on the received QoS intent and obtained specifications of available network QoS and QoS policies, at what time the at least one QoS requirement of the QoS intent can be fulfilled for the identified at least one wireless device. The time may be immediately, sometime in the future, or may in some examples be not before the furthest time period that can be predicted, meaning that for practical purposes, the time at which the QoS intent can be fulfilled is "never". Finally, the method 300 comprises informing the first node of a result of the determination in step 350. In some examples, the method 300 may further comprise implementing a QoS policy for at least one wireless device identified in the received QoS intent on the basis of the result of the determination.

It will be appreciated that the first node may comprise any logical entity, and may be external to or part of the communication network. For example, the first node may be managed by an application owner, and consequently may be a third-party server, application server or application function in a 3GPP network. In further examples, the first node could be a node that is internal to the operator's network, for example a network management node. This may be the case for example if a third-party has a service contract with the network operator, also known as a Service Level Agreement (SLA), which includes some QoS margins within which the network management node could negotiate.

For the purposes of the present disclosure, it will be appreciated that an ML model is considered to comprise the output of a Machine Learning algorithm or process, wherein an ML process comprises instructions through which data may be used in a training procedure to generate a model artefact for performing a given task, or for representing a real world process or system. An ML model is the model artefact that is created by such a training procedure, and which comprises the computational architecture that performs the task.

FIGS. 4a to 4g show flow charts illustrating process steps in another example of method 400 for managing Quality of Service (QoS) of wireless devices in a communication network. The method 400 provides various examples of how the steps of the method 300 may be implemented and supplemented to achieve the above discussed and additional functionality. As for the method 300, the method 400 is performed by a QoS management node which may comprise a physical or virtual node, and may be implemented in a server apparatus and/or in a virtualized environment, for example in a cloud or fog deployment. The QoS management node may for example be implemented in a core network of the communication network, and may in some examples encompass multiple logical entities. In some examples, the QoS management node may be a logically distinct function that is co-located with another node, or may be a separate physical node. In the case of co-location, the QoS management node may be co-located with an exposure function, such as the SCEF (4G) or NEF (5G).

Figure 4A:
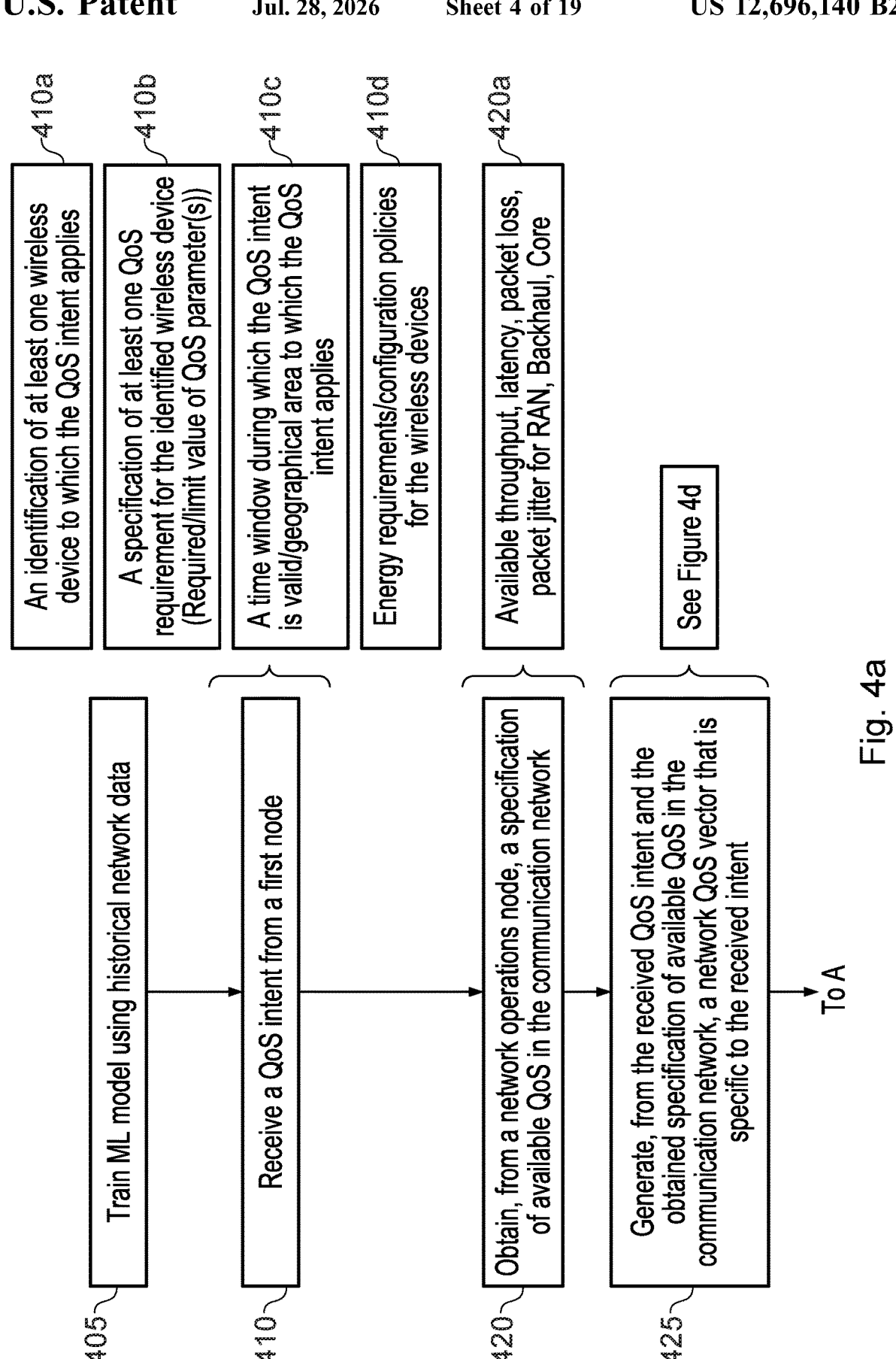

Referring initially to FIG. 4a, in a first step 405, the QoS management node trains the ML model that it will use to determine a time at which a received QoS intent can be fulfilled. The model is trained using historical communication network data. This may include for example data about QoS in the network over a period of time, information about QoS policies being enforced in the network during the period of time, wireless devices connected to the network during the period of time, network performance, etc.

In step 410, the QoS management node receives a QoS intent from a first node, which may be a management node, an application server, an application function, a third-party server, etc. as discussed above with reference to FIG. 3. In some examples, the QoS intent may be received from the first node via a network exposure function such as a 4G SCEF or a 5G NEF).

As illustrated at 410a and 410b, the QoS intent comprises an identification of at least one wireless device to which the QoS intent applies and a specification of at least one QoS requirement for the identified wireless device. As discussed above, the QoS intent defines a level of QoS for the identified wireless device or devices at a higher level of abstraction, with the one or more QoS requirements setting out at a lower level of abstraction specific expectations for QoS that must be satisfied for the QoS intent to be fulfilled. The QoS intent may further comprise a required or limit value of a QoS parameter in the communication network, as shown at 410c. Example QoS parameters may include QoS Class Identifier (QCI) and/or QoS Flow Identifier (QFI) parameters such as priority level, packet delay budget, packet error rate, packet jitter, resource type, etc. A limit value may be a maximum or minimum value for the relevant parameter. In some examples, the QoS parameter value or values may be included in the specification as a QoS requirement vector, each element of the vector comprising a required or limit value of a QoS parameter. In some examples, as shown at 410c, the QoS intent may further comprise at least one of a time window during which the QoS intent is valid, and/or a set of energy requirements for the identified wireless devices. A time window may start immediately, and so be characterized by a duration or an expiration time or date, or may in some examples be indefinite. In some examples, as shown at 410*d*, the QoS intent may further comprise at least one of configuration policies for the identified wireless devices, and/or a geographical area of coverage to which the QoS intent applies. A geographical area could for example be expressed using bounding boxes of geographical latitude and longitude or, in the case of a cellular communication network, a geographical area could be expressed using cell identifiers of the radio base stations to which the QoS intent applies. Databases such as https://www.opencellid.org map cell identifiers to geographical locations, although network operators maintain more detailed maps of their own cells. The time window, energy requirements, configuration policies, geographical area and/or any other elements included in the QoS intent may be included as elements in the QoS requirements vector discussed above.

In step 420, the QoS management node obtains, from a network operations node, a specification of available QoS in the communication network. As illustrated at 420*a*, the specification of available QoS in the communication network may comprise a specification of at least one of available throughput capacity in the communication network, a measure of latency in the communication network; a measure of packet loss within the communication network, and/or a measure of packet jitter in the communication network. The measure of latency may for example be a latency ceiling (highest amount of latency a network can exhibit), or may be average latency indicating the mean latency observed by the network. Packet jitter indicates the average deviation from true periodicity: the variation in latency. A large jitter value may indicate that the network delay is not constant, which can be an issue for real-time applications such as video streaming. The specification of available QoS may include values that are measured, observed or estimated end-to-end, via consideration of the contribution to each parameter of a Radio Access Network, Backhaul Network, and Core Network of the communication network, as discussed in greater detail below.

As illustrated at 420*a*, the specification of available QoS in the communication network may comprise a specification of at least one of available QoS in a Radio Access Network of the communication network, available QoS in a Backhaul Network of the communication network, and/or available QoS in a Core Network of the communication network.

In step 425, the QoS management node generates, from the received QoS intent and the obtained specification of available QoS in the communication network, a network QoS vector that is specific to the received QoS intent. Sub-steps that may be carried out by the QoS management node in order to generate the network QoS vector are illustrated in FIG. 4*d*, taking the example of a communication network that is a cellular communication network, such as a 3GPP network.

Referring now to FIG. 4*d*, in a first step 425*a*, the QoS management node assembles a cell list from the obtained specification of available QoS in the communication network and the received QoS intent, the cell list comprising identifiers of any cells currently serving at least one wireless device identified in the QoS intent and any cells that are neighbors of cells currently serving at least one wireless device identified in the QoS intent. The QoS management node then, for a given cell in the cell list, calculates at least one of average throughput capacity, average measure of latency, average measure of packet loss, and/or average measure of packet jitter in the cell in step 425*b*. In step 425*c*, the QoS management node calculates, for Backhaul connections identified as connecting the relevant cell to a Core Network of the communication network, at least one of average throughput capacity, average measure of latency, average measure of packet loss, average measure of packet jitter of the Backhaul connections. In step 425*d*, the QoS management node calculates, for Core Network paths connecting to the identified Backhaul connections, at least one of average throughput capacity, average measure of latency, average measure of packet loss, average measure of packet jitter of the Core Network paths. In step 425*e*, the QoS management node generates a current cell QoS vector for the relevant cell comprising at least one of:

the minimum value of the average throughput capacities for the cell, Backhaul connections and Core Network paths, the sum of the average measure of latency for the cell, Backhaul connections and Core Network paths;

the sum of the average measure of packet loss for the cell, Backhaul connections and Core Network paths, and/or the sum of the average measure of packet jitter for the cell, Backhaul connections and Core Network paths.

In some examples, the QoS management node may compute the average throughput capacities, average measure of latency and average measure of packet loss as a minimum, with the average packet jitter being included if available, or if considering packet jitter would be of particular advantage given the particular QoS intent, wireless devices, network conditions, or first node.

As illustrated at 425*g*, steps 425*b* to 425*e* are performed by the QoS management node for cells in the cell list assembled at step 425*a*. In step 425*f*, the QoS management node averages the values of the elements of the generated current cell QoS vectors across all cells in the assembled cell list.

It will be appreciated that for the purposes of the present description, a "cell" is considered to encompass a cellular-enabled mobile device site that consists of antennas and radio units (typically but not exclusively placed on radio towers, masts or on rooftops). This refers to the equipment that creates cells in a cellular network. A radio base station includes a cell and also includes ground equipment (such as baseband signal processing, power storage and supply and switching), which transfers data from a network endpoint (for example a cloud service) to and from mobile devices operating within the cell. It will also eb appreciated that the generated network QoS vector is specific to the received QoS intent in view of the use of the wireless devices identified in the received QoS intent to assemble the cell list.

Having generated the network QoS vector that is specific to the received QoS intent in step 425, the QoS management node then, in step 430, obtains a specification of QoS policies in the communication network from a policy control node, as illustrated in FIG. 4*b*. As shown at 430*a*, the specification of QoS policies in the communication network may comprise a set of policy rules currently applied in the network and parameters specified in the policy rules. The set may be arranged as a matrix, serialized, or arranged in any other suitable manner. In the case of a 3GPP network, the policy control node may be a PCRF (4G) or a PCF (5G).

In step 435, the QoS management node generates from the obtained specification of QoS policies in the network, a policy requirements vector indicating network capacity that is required to respect the QoS policies in the network.

Sub-steps that may be carried out by the QoS management node in order to generate the policy requirements vector are illustrated in FIG. 4e.

Referring now to FIG. 4e, in a first step 435a, the QoS management node checks for an expiry time of a time window during which the received QoS intent is valid. The QoS management node then identifies any policies in the specification of QoS policies in the network that expire before the expiry time of the time window during which the QoS intent is valid in step 435b. In step 435c, the QoS management node checks for priority associated with one or more services to which the policies in the obtained specification apply.

In step 435d, the QoS management node generates an aggregated throughput requirement as the sum of Uplink Guaranteed Bit Rate requirements and Downlink Guaranteed Bit Rate requirements for policies in the network. In step 435e, the QoS management node identifies a maximum policy latency as the maximum value of latency specified in the policies in the network, and in step 435f, the QoS management node calculates an average packet loss from the packet losses specified in the policies in the network. In step 435g, the QoS management node calculates an average packet jitter from the packet jitters specified in the policies in the network. As illustrated in step 435g, the QoS management node may apply a discount coefficient, based on a time difference between expiry of a policy and expiry of the QoS intent time window, to the contribution of the policies identified in step 435b to the aggregated throughput requirement, maximum policy latency, average packet loss, average packet jitter of the policy requirements vector. The discount coefficient may for example be calculated based on a percentage difference in time remaining of policy rule and QoS intent. Also as illustrated at step 435g, the QoS management node may apply a priority coefficient, based on priority, to the contribution of the policies identified in step 435c to the aggregated throughput requirement, maximum policy latency, average packet loss, average packet jitter of the policy requirements vector.

In some examples, the QoS management node may determine the extent to which policy rules in the obtained specification of QoS policies are likely to impact available capacity for the wireless devices in the QoS intent. For example, the QoS management node may initially filter the policies in the obtained specification by relevance to the wireless devices in the QoS intent. In one example, this could be based on geographical overlap as set out below. In a first step, the QoS management node could find wireless devices identified in policies in the network, which wireless devices are geographically close to wireless devices specified in the QoS intent. Geographical closeness could be defined as being either attached to the same cell or to a neighboring cell. Neighbor cells could also be parameterized by degree, such that a second-degree neighbor is the neighbor of a neighbor. The QoS management node could then identify policy rules applying to the wireless devices that have been found to be geographically close to the wireless devices identified in the received QoS intent, and use only those policies to generate the policy requirements vector as set out in FIG. 4e.

Referring again to FIG. 4b, following generation of the policy requirements vector in step 435, the QoS management node uses an ML model to determine, based on the received QoS intent and obtained specifications of available network QoS and QoS policies, at what time the at least one QoS requirement of the QoS intent can be fulfilled for the identified at least one wireless device. This may comprise inputting the generated network QoS vector and the generated policy requirements vector to the ML model.

As illustrated at 440i, using the ML model to determine at what time the at least one QoS requirement of the QoS intent can be fulfilled for the identified at least one wireless device may comprise determining at least one of (1) from what time the at least one QoS requirement of the QoS intent can be fulfilled for the identified at least one wireless device and/or (2) until what time the at least one QoS requirement of the QoS intent can be fulfilled for the identified at least one wireless device. Time in this case may be measured at any appropriate degree of granularity, and may then be specified with an accuracy of days, hours, minutes, seconds, etc.

In some examples, as illustrated at 440ii, using the ML model to determine at what time the at least one QoS requirement of the QoS intent can be fulfilled for the identified at least one wireless device may comprise at least one of:
    classifying the received QoS intent into at least one of a plurality of time windows during which the at least one QoS requirement of the QoS intent can be fulfilled for the identified at least one wireless device, or
    predicting an earliest time at which the at least one QoS requirement of the QoS intent can be fulfilled for the identified at least one wireless device.

The ML model may consequently comprise a classification model or regression model. In some examples, the ML model may comprise a Long Short-Term Memory Recurrent Neural Network. As discussed above, the inputs for the ML model may comprise the generated network QoS vector, expressing available QoS in the network with respect to the wireless devices identified in the QoS intent, the generated policy requirements vector, expressing QoS requirements for policies already enforced in the network (or anticipated to be enforced), and the QoS intent itself, expressing the requirements of the first node for the identified wireless devices. The ML model may map these inputs to an output indicating a time at which the received QoS intent can be fulfilled. As discussed above, in a classification model, the ML model may output probabilities that the QoS intent can be fulfilled in any one of a plurality of time windows. In a regression model, the ML model may output an estimated earliest time at which the QoS intent can be fulfilled. In the case of a lack of network resources (or lack of network coverage for identified wireless devices) meaning the QoS intent cannot be fulfilled within a time period for which the ML model is able to predict, the ML model may output a suitable response, for example classifying the output into a "never" time window, or converging to an output prediction that is beyond a working range of the model, or failing to converge.

Sub-steps that may be carried out by the QoS management node in order to perform step 440 are illustrated in FIGS. 4f and 4g. Referring initially to FIG. 4f, in a first step 440a, the QoS management node identifies additional network capacity required to fulfil the at least one QoS requirement of the QoS intent. The QoS management node then identifies, in step 440b, a candidate set of communication network policies that would enable fulfillment of the at least one QoS requirement of the QoS intent without violating existing QoS policies in the communication network. If the QoS management node finds at step 440c that the candidate set contains no policies, then the QoS management node proceeds to step 440k illustrated in FIG. 4g and discussed in further detail below.

If the QoS management node finds at step 440c that the candidate set contains at least one policy, then the QoS management node checks in step 440*d* whether one or more policies exist in the candidate set that enable immediate fulfillment of the at least one QoS requirement of the QoS intent. If this is the case (Yes at step 440*d*), then the QoS management node determines until when the one or more policies can fulfil the at least one QoS requirement of the QoS intent in step 440*h*, and selects the policy that enables fulfilment for the longest time period in step 440*j*. The QoS management node then determines, in step 440*j*, that the at least one QoS requirement of the QoS intent can be fulfilled immediately and until the determined time.

If the QoS management node determines at step 440*d* that no policy exists in the candidate set that enables immediate fulfillment of the at least one QoS requirement of the QoS intent (No at step 440*d*), then the QoS management node identifies in step 440*e* the earliest time at which any policy in the candidate set is able to fulfil the at least one QoS requirement of the QoS intent. The QoS management node then selects the policy that enables fulfilment at the earliest time, and determines that the at least one QoS requirement of the QoS intent can be fulfilled from the identified time. The QoS management node may additionally determine until when the selected policy can fulfil the QoS intent.

Returning to step 440*c*, and with additional reference to FIG. 4*g*, if the QoS management node finds at step 440*c* that the candidate set does not contain any policies, then it performs at least one of an intent adaptation process or a configuration recommendation process, and may determine which process to perform at step 440*k*. This determination may be programmed according to operator preference, or according to SLAs with specific third parties, and may consequently be based on the identity of the first node from which the QoS intent was received, etc.

An intent adaptation process seeks to find amendments to the received QoS intent that would enable the QoS intent to be fulfilled (or in some examples to be fulfilled earlier, as discussed in further detail below). As illustrated in FIG. 4*g*, an intent adaptation process may comprise, at step 440*l*, generating a plurality of adapted QoS intents, each adapted QoS intent incorporating a change in at least one element of the received QoS intent. The intent adaptation process may further comprise, at step 440*m*, identifying any of the generated adapted QoS intents for which the at least one QoS requirement of the adapted QoS intent could be fulfilled within a threshold time period, and, at step 440*n*, selecting, from the identified adapted QoS intents, the adapted QoS intent having the smallest difference from the received QoS intent according to a difference function. The difference function could take a range of different forms, and may for example comprise an evaluation process that favors for example adaptations that change the wireless devices to which the QoS intent is applied over adaptations that reduce/increase or otherwise change the QoS parameters (for example preferring an adaptation that means the QoS intent does not apply to devices that are out of coverage).

A configuration recommendation process seeks to find amendments to network or wireless device configurations that would enable the QoS intent to be fulfilled (or in some examples to be fulfilled earlier, as discussed in further detail below). As illustrated in FIG. 4*g*, a configuration recommendation process may comprise, at step 4400, identifying a configuration of at least one of network or wireless device parameters that would enable the QoS requirement of the received QoS intent to be fulfilled. As illustrated at 440*p*, this may comprise using an ML model to identify the configuration based on at least one of historical data in the communication network or records of offline training performed using digital representations of wireless devices and network nodes.

In some examples, the determination as to whether to perform an intent adaptation or configuration recommendation process may also be carried out if the QoS intent cannot be fulfilled immediately, in order to identify policies or QoS requirement changes that would enable immediate fulfillment of the QoS intent. For example, the QoS management node may proceed to step 440*k* in the event of a "No" at step 440*d*, or if the identified earliest time from step 440*e* is too far in the future (beyond a threshold time). It will be appreciated that the precise conditions under which to commence an intent adaptation or configuration recommendation process may be configured by a network operator, and may be adapted to specific contracts or SLAs with individual third parties.

Figure 4C:
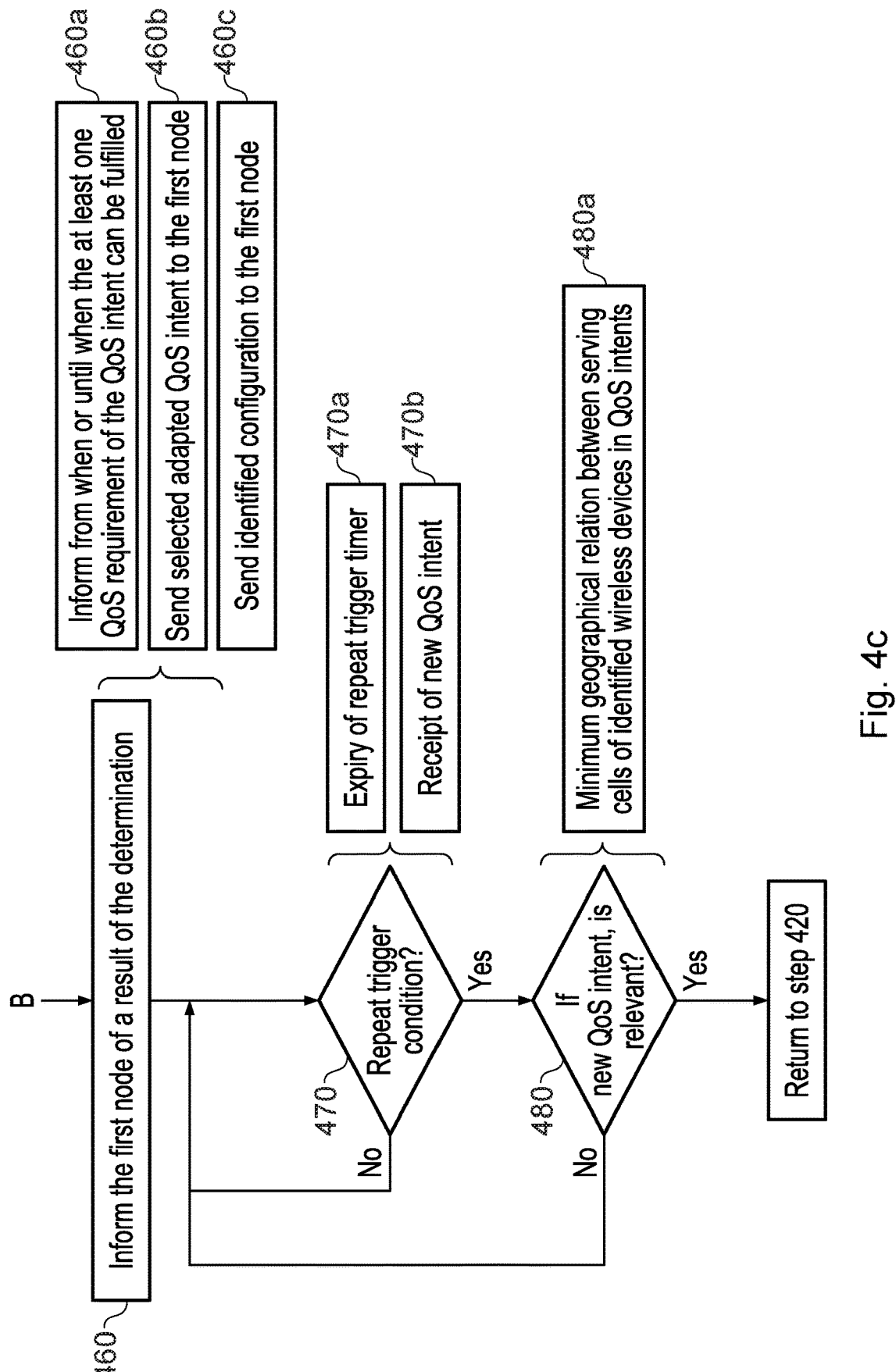

Following determination in step 440 of at what time the at least one QoS requirement of the QoS intent can be fulfilled for the identified at least one wireless device, the QoS management node then informs the first node of a result of the determination in step 450 as illustrated in FIG. 4*c*. The QoS management node may inform the first node via another node, for example sending a message to a capability exposure node for forwarding on to the first node. Informing the first node may comprise, in step 460*a*, informing the first node of at least one of from when or until when the at least one QoS requirement of the QoS intent can be fulfilled. As discussed above, "from when" may include immediately, i.e. from now, or from some specific time point in the future, and "until when" may include indefinitely or until some later specific time point in the future. Informing the first node may additionally or alternatively comprise, at step 460*b* and 460*c*, sending the selected adapted QoS intent from an intent adaptation process, or the identified configuration from a configuration recommendation process, to the first node.

In some examples, the QoS management node may then receive acceptance, non-acceptance, and/or a counteroffer from the first node. This may be received in response to any information provided in step 460. For example, if the QoS intent can be fulfilled immediately and for the duration of a time window specified in the QoS intent, then the first node may indicate acceptance. In the event that the QoS intent cannot be fulfilled for the duration of a specified time window, (i.e. following an informing step comprising information of from when and/or to when the QoS intent can be fulfilled, an adapted intent or a recommended configuration), the first node may indicate acceptance or may indicate non-acceptance or suggest an alternative proposal. The QoS management node and first node may consequently enter into a period of negotiation to identify an acceptable solution.

As discussed above with reference to FIG. 3, the QoS management node may then implement a QoS policy for at least one wireless device identified in the received QoS intent on the basis of the result of the determination.

Referring still to FIG. 4*c*, in step 470, the QoS management node checks for fulfilment of a repeat trigger condition. This may for example comprise expiry of a repeat trigger timer, and/or receipt of a new QoS intent from a first node, wherein the new QoS intent fulfils a relevance criterion with respect to the originally received QoS intent. If the QoS management node determines fulfilment of a repeat trigger criterion comprising receipt of a new QoS intent, the QoS management node consequently checks at step 480 whether or not the newly received QoS intent fulfils a relevance criterion. The relevance criterion may for example comprise a minimum geographical relation between the serving cells of the wireless devices identified in the originally received QoS intent and the newly received QoS intent as illustrated at 480a. In other examples, the relevance criterion may be set so that all newly received QoS intents are considered to fulfil the repeat trigger condition.

If the repeat trigger condition is fulfilled, the QoS management node then returns to step 420 to repeat the steps of:

obtaining, from the network operations node, a specification of available QoS in the communication network obtaining, from the policy control node, a specification of QoS policies in the communication network, using the ML model to determine, based on the received QoS intent and obtained specifications of available network QoS and QoS policies, when the at least one QoS requirement of the QoS intent can be fulfilled for the identified at least one wireless device, and informing the first node of a result of the determination;

As discussed above, the methods 300 and 400 may be performed by a QoS management node, and the present disclosure provides a QoS management node that is adapted to perform any or all of the steps of the above discussed methods. The QoS management node may comprise a physical node such as a computing device, server etc., or may comprise a virtual node. A virtual node may comprise any logical entity, such as a Virtualized Network Function (VNF) which may itself be running in a cloud, edge cloud or fog deployment. The QoS management node may for example comprise or be instantiated in any part of a communication network node such as a logical core network node, network management center, network operations center, Radio Access node etc. Any such communication network node may itself be divided between several logical and/or physical functions, and any one or more parts of the QoS management node may be instantiated in one or more logical or physical functions of a communication network node.

Figure 5:
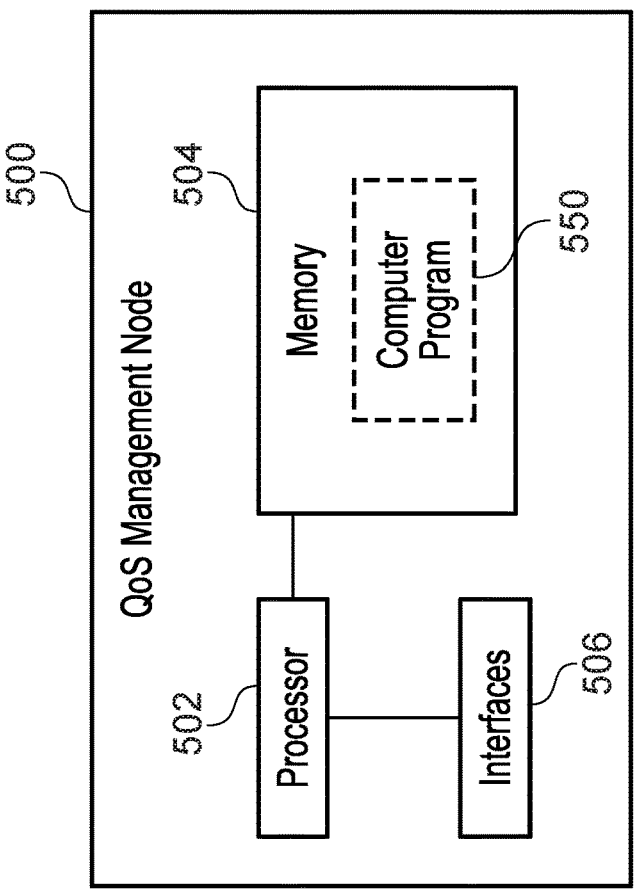
FIG. 5 is a block diagram illustrating functional units in an example QoS management node.

FIG. 5 is a block diagram illustrating an example QoS management node 500 which may implement the method 300 and/or 400, as illustrated in FIGS. 3 to 4g, according to examples of the present disclosure, for example on receipt of suitable instructions from a computer program 550. Referring to FIG. 5, the QoS management node 500 comprises a processor or processing circuitry 502, and may comprise a memory 504 and interfaces 506. The processing circuitry 502 is operable to perform some or all of the steps of the method 300 and/or 400 as discussed above with reference to FIGS. 3 to 4g. The memory 504 may contain instructions executable by the processing circuitry 502 such that the QoS management node 500 is operable to perform some or all of the steps of the method 300 and/or 400, as illustrated in FIGS. 3 to 4g. The instructions may also include instructions for executing one or more telecommunications and/or data communications protocols. The instructions may be stored in the form of the computer program 550. In some examples, the processor or processing circuitry 502 may include one or more microprocessors or microcontrollers, as well as other digital hardware, which may include digital signal processors (DSPs), special-purpose digital logic, etc. The processor or processing circuitry 502 may be implemented by any type of integrated circuit, such as an Application Specific Integrated Circuit (ASIC), Field Programmable Gate Array (FPGA) etc. The memory 504 may include one or several types of memory suitable for the processor, such as read-only memory (ROM), random-access memory, cache memory, flash memory devices, optical storage devices, solid state disk, hard disk drive etc. The interfaces 506 may be operable to facilitate communication with an exposure node or function, a first node, a network operations node, a policy control node and/or with other communication network nodes over suitable communication channels.

Figure 6:
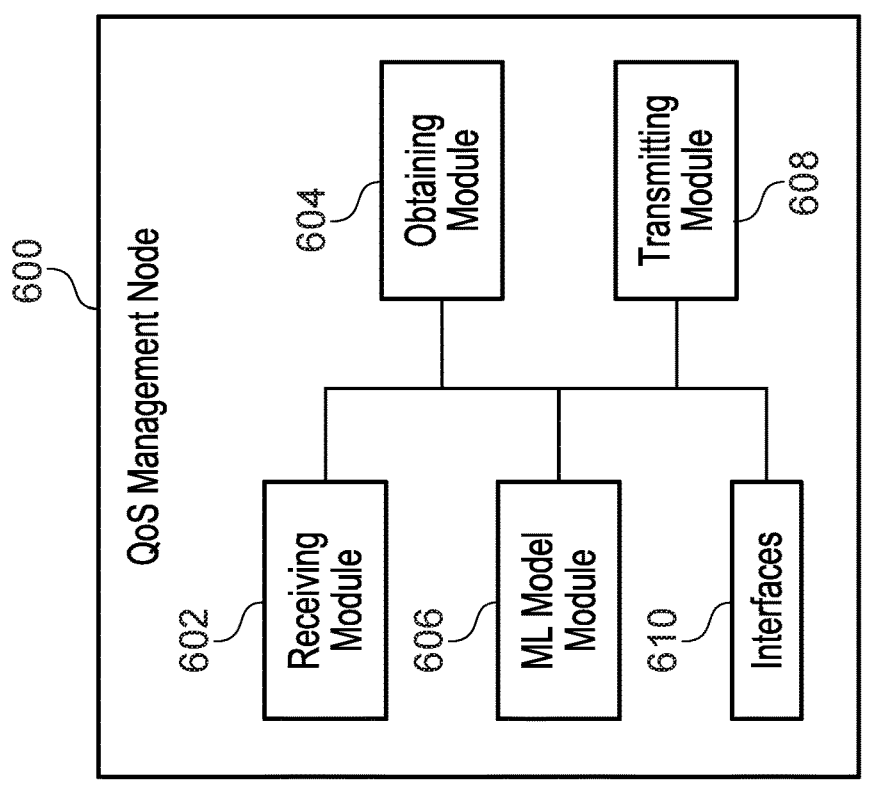
FIG. 6 is a block diagram illustrating functional units in another example of a QoS management node.

FIG. 6 illustrates functional modules in another example of QoS management node 600 which may execute examples of the methods 300 and/or 400 of the present disclosure, for example according to computer readable instructions received from a computer program. It will be understood that the modules illustrated in FIG. 6 are functional modules, and may be realized in any appropriate combination of hardware and/or software. The modules may comprise one or more processors and may be integrated to any degree.

Referring to FIG. 6, the QoS management node 600 is for managing QoS of wireless devices in a communication network. The QoS management node 600 comprises a receiving module 602 for receiving a QoS intent from a first node, the QoS intent comprising an identification of at least one wireless device to which the QoS intent applies and a specification of at least one QoS requirement for the identified wireless device. The QoS management node 600 further comprises an obtaining module 604 for obtaining, from a network operations node, a specification of available QoS in the communication network, and for obtaining, from a policy control node, a specification of QoS policies in the communication network. The QoS management node 600 further comprises an ML model module 606 for using an ML model to determine, based on the received QoS intent and obtained specifications of available network QoS and QoS policies, at what time the at least one QoS requirement of the QoS intent can be fulfilled for the identified at least one wireless device. The QoS management node 600 further comprises a transmitting module 608 for informing the first node of a result of the determination. The QoS management node 600 may further comprise interfaces 610 which may be operable to facilitate communication with an exposure node or function, a first node, a network operations node, a policy control node and/or with other communication network nodes over suitable communication channels.

FIGS. 3 to 4g discussed above provide an overview of methods which may be performed according to different examples of the present disclosure. These methods may be performed by a QoS management node, as illustrated in FIGS. 5 and 6. There now follows a detailed discussion of how different process steps illustrated in FIGS. 3 to 4g and discussed above may be implemented. The functionality and implementation detail described below is discussed with reference to an implementation of a QoS management node referred to as an "Intent Handler". It will be appreciated however that this is merely one example implementation of a QoS management node in accordance with the present disclosure. The functionality described below may also be implemented in any example of the nodes illustrated in FIGS. 5 and 6, performing examples of the methods 300 and/or 400, substantially as described above.

Figure 7A:
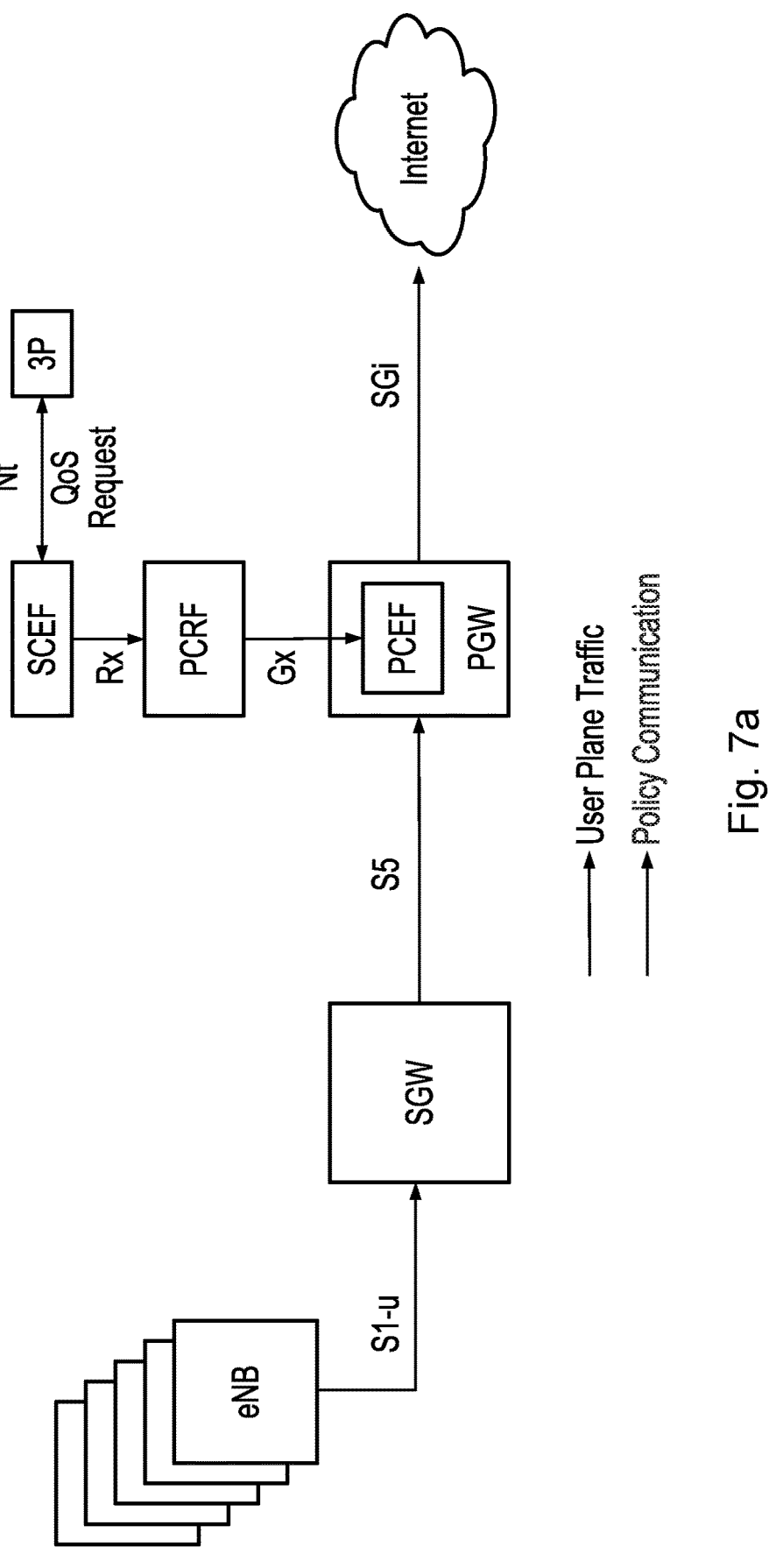
FIGS. 7a and 7b illustrate integration of a QoS management node into a 4G network architecture.
Figure 7B:
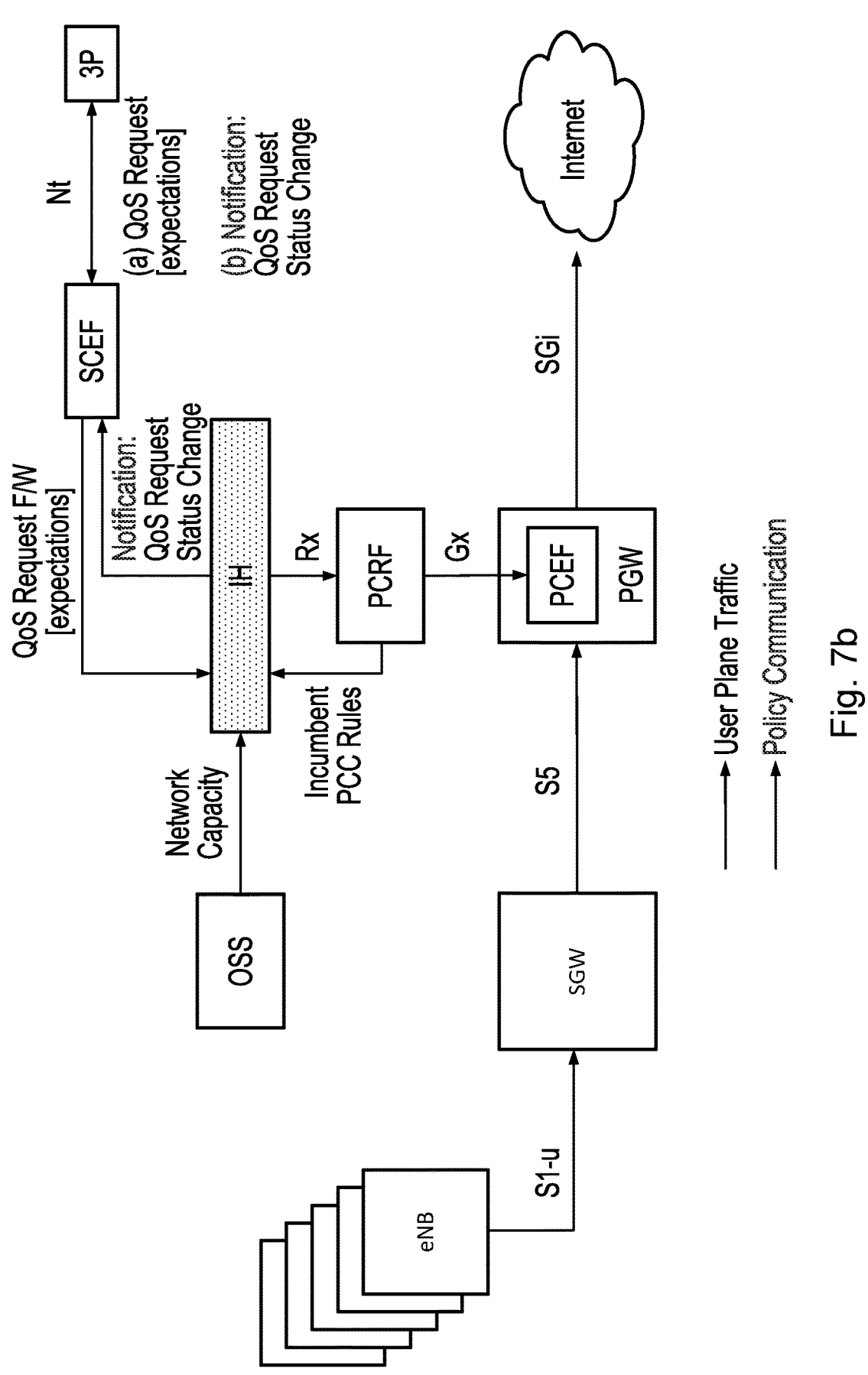

FIGS. 7a and 7b illustrate how a QoS management node in the form of an Intent Handler IH may be integrated into the existing 3GPP mobile network architecture for 4G networks. FIG. 7a illustrates the existing 4G architecture for QoS management, showing radio base stations (eNBs), a Serving Gateway SGW, Packet Gateway PGW and the PCEF, PCRF and SCEF nodes discussed above. FIG. 7b illustrates how policy communication may be amended to accommodate the functionality of a QoS management node implemented as an Intent Handler (IH). The IH is illustrated as a separate logical function, although it may be co-located with another node as discussed below. It will be appreciated that a similar architecture diagram to that shown in FIG. 7*b* could be envisaged for the architecture of a 5G 3GPP network, with appropriate network management, policy control and exposure nodes, as well as the relevant 5G interfaces. In FIGS. 7*a* and 7*b*, 3*p* stands for "third party", that is the entity that provides the QoS intent.

As discussed above, a QoS intent is characterized by QoS requirements, which set out the expectations of the party submitting the intent with regard to QoS. A QoS intent is therefore an assurance of some level of Quality of Service, and the QoS requirements of the QoS intent set out features that are required in order to fulfil that level of service. These features may for example comprise or be mapped to required or limit values of QoS parameters, such as the QCI and QFI parameters discussed above. In addition, the QoS requirements may include features including the duration of the QoS intent, as well as battery-saving policies like guaranteed joule-per-bit.

The Intent Handler receives and processes the QoS intent. In some examples, the IH may be co-located with a capability exposure function (SCEF in 4G or NEF in 5G). An advantage of such co-location is that the SCEF and NEF already have interfaces to communicate with network management nodes (Operations Support System (OSS)) and policy control nodes (PCRF in 4G and PCF in 5G), that supply the information to enable the IH to determine or predict when the network will be able to fulfil to received QoS intent. Detailed functionality of the IH is discussed below.

Figure 8:
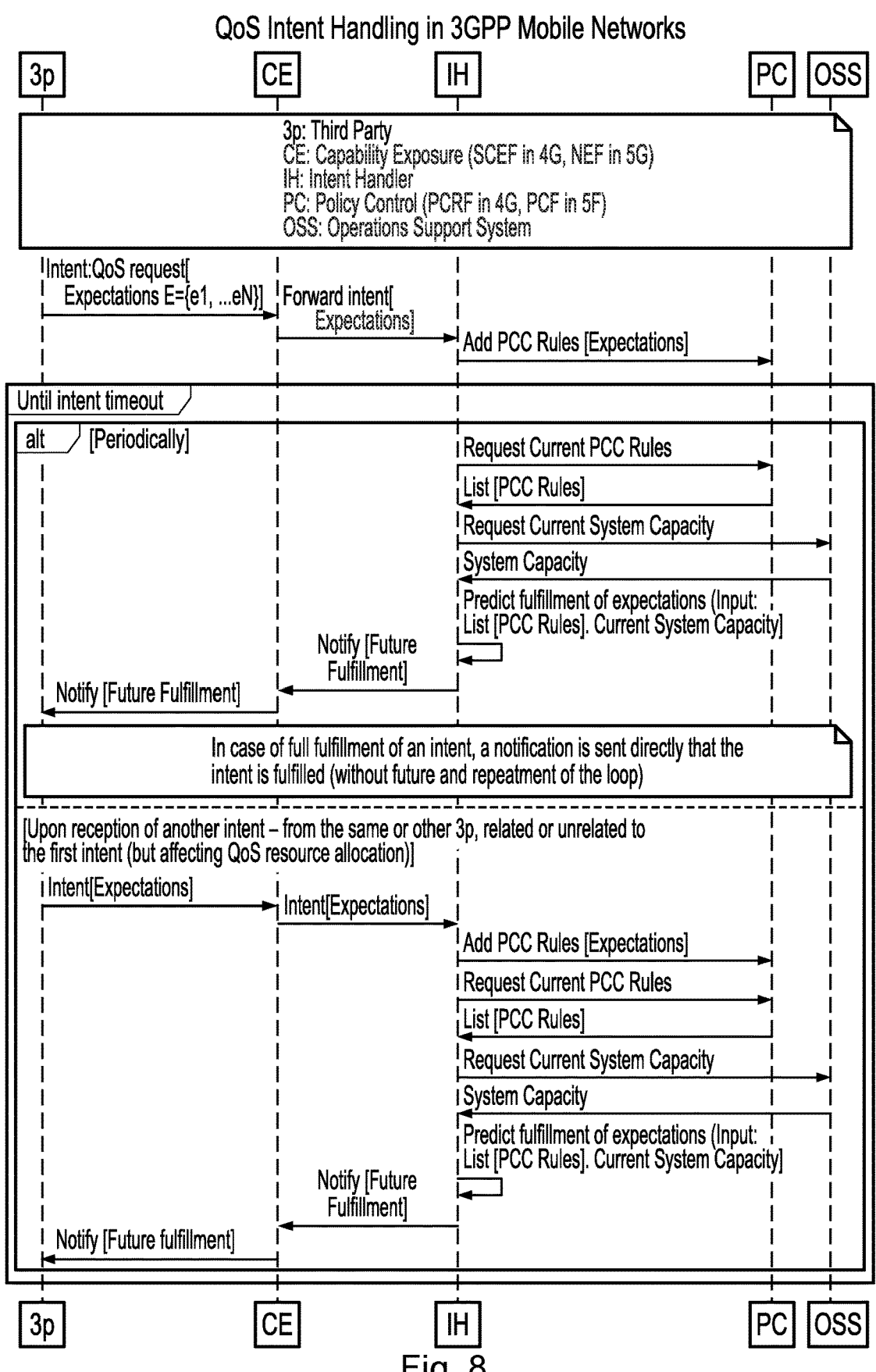
FIG. 8 is a sequence flow diagram illustrating message flow.

FIG. 8 is a sequence flow diagram illustrating message flow and processing according to an example implementation of the methods of the present disclosure. The diagram of FIG. 8 uses generic names for individual nodes, and examples of such generic nodes in 4G and 5G 3GPP network architectures are introduced at the top of FIG. 8. Referring to FIG. 8, the process begins with communication by a third party (3p) of a QoS intent to a Capability Exposure function (CE). The QoS intent comprises a plurality of QoS requirements, illustrated in FIG. 8 as QoS Expectations e1 to eN. The CE forwards the received QoS intent to the Intent Handler (IH, an implementation of a QoS management node) without additional processing. The IH then starts an intent handling process according to the methods 300, 400 above. During the intent handling process, the IH requests information from a policy control (PC) node and Operations Support System (OSS) node. From the PC node, the IH retrieves policy control rules currently in the system. From the OSS the IH retrieves current system capability to provide QoS. The OSS may retrieve information about bandwidth, latency ceiling, packet drops etc. from all parts of the operator network (i.e., from RAN to backhaul/transport and core network user plane data flow) and provides these to the IH.

On receipt of the requested information, the IH then considers whether the network can fulfill the QoS intent completely using current system capacity, by comparing the current system capacity for QoS, taking account of existing rules to be enforced, with the expectations of the QoS intent. If the QoS intent cannot be fulfilled immediately, the IH can provide an estimate of when and/or to what extent the QoS intent can be fulfilled. This can be achieved using a trained ML model such as a Neural Network that can classify future demand based on current status and on patterns of enforcement of PCC rules over time (and parameters of those PCC rules). The estimate provided may include not only when the QoS intent will be fulfilled in its entirety, but also if a greater or lesser part of the QoS intent can be fulfilled in the future compared to what part of the intent can be fulfilled immediately.

The intent handling process can be repeated periodically, and may be interrupted by the arrival of another QoS intent to be accommodated. If another QoS intent is received, the IH checks if this new QoS intent will impact upon fulfillment of previously received QoS intents, and informs the 3p accordingly.

The following discussion provides further detail illustrating implementation of the intent handling process according to the methods 300, 400 and as set out with reference to FIGS. 3 to 4*g* above.

FIG. 9 illustrates an example of a specification of QoS policies that may be obtained by the IH from a policy control node. The example specification in FIG. 5 illustrates an excerpt of policy rules currently held by a PCRF node and being enforced in a network.

FIG. 10 illustrates an example specification of available QoS in a communication network. The specification illustrates available QoS in a Radio Access Network (RAN), Backhaul network (BK), which is the transport network connecting the RAN to the Core, and Core network. The values in the specification of FIG. 10 are exemplary values of capacity information from probes in the RAN, BK, and Core. There may be multiple cells (or radio base stations) connected to the Core via the same backhaul connection, and in the core network there may be multiple network paths connecting multiple backhaul paths from SGW to PGW. It will be appreciated that this network setup is merely for the purposes of illustration, and the communication network may be designed in different ways. The information populating the specification illustrated in FIG. 10 can be obtained by an OSS node using performance monitor counters in the RAN and probes in the BK and core network.

The IH collects the illustrated information at time T minus a time window, in order obtain an overview of the current capacity of the network. It will be appreciated that in order to save space, wireless device (UE) identities in the RAN capacity are illustrated using integer numbers instead of the longer international mobile subscriber identifiers (IMSIs) that would likely be used in practice.

FIG. 11 illustrates an example of a QoS intent as a feature vector, with its identification or wireless devices (list of UEs) and component QoS requirements, or expectations. The QoS requirements include various required or limit values for QoS parameters as well as a time window for application of the QoS intent.

In order for the IH to be able to predict when fulfillment of QoS intent in FIG. 11 will be possible, based on the specifications illustrated in FIGS. 9 and 10, the IH may implement steps of the method 400. One example implementation of these steps is set out below.

The IH requests current capacity of the mobile network from OSS at the moment the QoS intent request is received. The OSS responds with the latest data and historical data from a preset window (Step 420).

The IH aggregates all measurements from T to T–window, as "available capacity" as follows (Step 425):

From RAN Capacity in FIG. 10, find CellIDs in RAN capacity measurement that are serving UEs in the list illustrated in FIG. 11. Also find neighboring CellIDs (i.e., adjacent numbers). Put all CellIDs in a list (Step 425*a*).

For each Cell*i* D in list of Cell*i* Ds (Step 425*g*):

Extract all CellID records from RAN Capacity and average throughput, packet loss and latency. Calculate throughput_capacity(RAN)=bandwidth−average throughput (Step 425*b*).

Find BK capacity records with BK ID that includes CellID (see FIG. 10, BK Capacity information at time T) and average throughput, packet loss and latency. Calculate throughput_capacity(BK)= bandwidth−average_throughput (Step 425*c*)

Find Core N/W capacity by finding records that include BK ID that includes Cell ID and average throughput, packet loss and latency. Calculate throughput_capacity(Core)=bandwidth−average_throughput (Step 425*d*)

Calculate cell_current_capacity as a vector of:

Thr_capacity=min(throughput_capacity(Core), throughput_capacity(BK), throughput_capacity (RAN)

Latency_capacity=sum(avg_latency(RAN), avg_latency(Core), avg_latency(BK))

Packet_loss_capacity=sum(packet_loss(RAN), packet_loss(Core), packet_loss(BK)) (Step 425*e*)

Push cell_current_capacity to cell_capacity_list

Iterate cell_capacity_list and create a total_network_capacity as an average of all 3 features of each vector across all cells (Step 425*f*)

From PCC rules list as illustrated in FIG. 9, the IH creates a vector representing current rule state, called pcc_rule_state. The first element in the vector is the number of pcc rules, the second is the aggregated throughput (sum of UL and DL for PCC rules that have GBR as Resource Type), the third is the latency ceiling (max latency from PCC rules), the fourth is packet loss (average loss from PCC rules).

If an expiry time/date date is used in QoS intent payload vector, then PCC rules that expire before the expiry date of the QoS intent payload vector may be taken into account in the calculation of the elements of the vector at a discounted rate. A discount coefficient may be equal to a 0 to 1 normalized value and may be computed as the fraction of PCC rule duration from current time divided by the QoS intent duration from current time. Throughput may be calculated using the discount coefficient (multiply corresponding PCC rule by the discount coefficient). The discount coefficient may be omitted for latency ceiling or packet loss calculation.

Input qos_intent_feature_vector (see FIG. 11), pcc_rule_state and total_network_capacity to a trained ML model, for example a Neural Network, that can predict when the feature vector will be fulfilled given current PCC rule state and network capacity. The neural network can be trained to provide classification as to the probability that the intent supplied from the third party will be fulfilled in distinct time quota, as classes.

Figure 12:
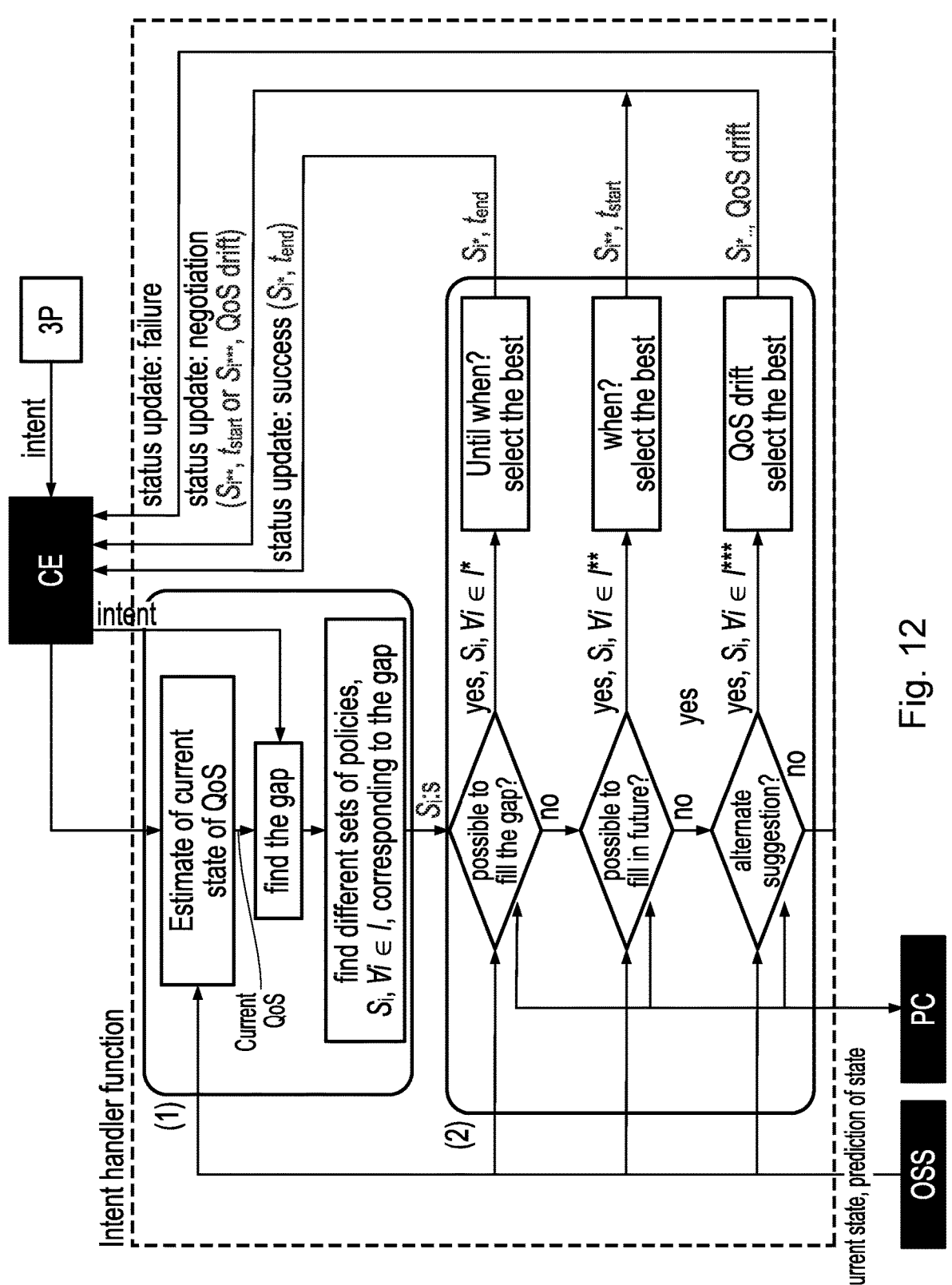
FIG. 12 illustrates an implementation of an intent handling process.

FIG. 12 illustrates an example implementation of the intent handling process, including the intent adaptation and configuration recommendation procedures illustrated in FIGS. 4*f* and 4*g*. These procedures may form part of a negotiation between the IH and the 3p. FIG. 12 illustrates three possible outputs for the step of using an ML model to determine a time at which a received QoS intent can be fulfilled: Success (QoS intent can be immediately fulfilled), Negotiation (QoS can be fulfilled in the future, or an alternative suggestion is proposed), and Failure.

Referring to FIG. 12, (1) is a subfunction which provides different sets of policies: each policy in a set, i.e. $s_i$, $\forall i \in I$, is expected to fulfil a gap corresponding to one or more expectations of the intent I. Here, I indicates $\cup_i s_i$. Mapping these policies to the requested intents (QoS vectors) is a task that can be done using an ML model, owing to the fact that in the long term, many QoS intents will be correlated, for example resolution improvement for streaming of one application will be useful for another application in the future.

Referring still to FIG. 12, (2) is a subfunction that communicates with the policy control (PC) and finds, if neither immediate fulfilment $(S_{i*})$ nor delayed fulfilment $(S_{i})$ are possible, whether policy sets, $I* \subset I$ exist that enable an intent close to the one requested by the 3p to be fulfilled. The IH may follow either the intent adaptation approach or the configuration recommendation approach for this.

In intent adaptation, the IH starts relaxing one or some of the QoS requirements in the received QoS intent, labels the adapted QoS intent, and tries to handle the adapted QoS intent. Then, among the generated adapted QoS intents that can be fulfilled, the IH selects the adapted QoS intent with the minimum drift from the requested QoS intent and sends it back to capability exposure for negotiation with the 3p. In this case, the 3p will be notified that while its requested QoS intent cannot be fulfilled, a similar QoS intent could be fulfilled. For example, with reference to the QoS intent illustrated in FIG. 11, the IH can notify capability exposure that the requested QoS intent can be fulfilled for the requested UEs except for the UE #4 and UE #543, and/or the requested QoS intent can be fulfilled but the latency per device could go up to 15 ms in some hours.

An advantage of the intent adaptation approach is that it may be carried out relatively quickly as it requires generating reduced versions of the original QoS intent. However, it may be that the received QoS intent represents the minimum requirement of the customer, in which case an adapted version may not be acceptable.

In configuration recommendation, the IH maintains the original QoS intent and tries to identify collaborative reconfiguration of services such that the requested QoS intent can be fulfilled. For example, an IoT solution may be envisaged comprising N battery powered IoT devices of type K that have been deployed in a service area in which wireless connectivity solutions are available from operator A. In this example, the operator receives a battery lifetime intent from the IoT solution owner asking for a specific battery lifetime on the k-type devices. An IH in the operator network investigates the required policies for serving the new traffic over RAN, BK, and Core, and finds that the battery lifetime intent cannot be fulfilled. However, if the IoT solution owner agrees to collaboratively set the eDRX parameter for the target device beyond x minutes, the requested service will be satisfied. This offer could be derived from the network leveraging its past experience in handling other intents or offline training ML models over digital twins. The offer is then sent back to the IoT solution owner for further negotiation Examples of the present disclosure provide methods and nodes, which, on receipt of a QoS intent concerning one or more wireless devices, determine on the basis of information about current network QoS and policy rules, at what time the QoS intent may be fulfilled. If the QoS intent cannot be fulfilled immediately, information may be provided to the originator of the QoS intent regarding from when/until when it can be fulfilled, and/or including suggestions for changes in the QoS intent or in other network or device parameters that would enable the QoS intent to be fulfilled. A negotiation may be entered into in order to identify a solution that is acceptable to the owner or manager of the devices and is possible for the network. The methods and nodes represent an intent-driven, cognitive approach to the challenge of managing QoS in communication networks.

Examples of the present disclosure offer more flexible and transparent fulfillment of QoS requests, particularly when capacity in the communication network may be insufficient to immediately fulfill a QoS request. Wireless device owners requesting QoS for their devices are provided with information that allows them to better manage their devices and services.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method for managing Quality of Service, QoS, of wireless devices in a communication network, the method, performed by a QoS management node, comprising:
  receiving a QoS intent from a first node, the QoS intent comprising:
    an identification of at least one wireless device to which the QoS intent applies; and
    a specification of at least one QoS requirement for the identified wireless device;
  obtaining, from a network operations node, a specification of available QoS in the communication network;
  obtaining, from a policy control node, a specification of QoS policies in the communication network;
  using a Machine Learning, ML, model to determine, based on the received QoS intent and obtained specifications of available network QoS and QoS policies, at what time the at least one QoS requirement of the QoS intent can be fulfilled for the identified at least one wireless device; and
  informing the first node of a result of the determination;
  wherein using the ML model to determine, based on the received QoS intent and obtained specifications of available network QoS and QoS policies, at what time the at least one QoS requirement of the QoS intent can be fulfilled for the identified at least one wireless device comprises:
  identifying additional network capacity required to fulfil the at least one QoS requirement of the QoS intent;
  identifying a candidate set of communication network policies that would enable fulfillment of the at least one QoS requirement of the QoS intent without violating existing QoS policies in the communication network;

if one or more policies exist in the candidate set that enable immediate fulfillment of the at least one QoS requirement of the QoS intent:
    determining until when the one or more policies can fulfil the at least one QoS requirement of the QoS intent;
    selecting the policy that enables fulfilment for the longest time period; and
    determining that the at least one QoS requirement of the QoS intent can be fulfilled immediately and until the determined time.

2. A method as claimed in claim 1, wherein a QoS requirement comprises a required or limit value of a QoS parameter in the communication network.

3. A method as claimed in claim 1, wherein the QoS intent further comprises at least one of:
  a time window during which the QoS intent is valid;
  a set of energy requirements for the identified wireless devices;
  configuration policies for the identified wireless devices;
  geographical area of coverage to which the QoS intent applies.

4. A method as claimed in claim 1, wherein the specification of available QoS in the communication network comprises a specification of at least one of:
  available throughput capacity in the communication network;
  a measure of latency in the communication network;
  a measure of packet loss within the communication network;
  a measure of packet jitter in the communication network.

5. A method as claimed in claim 1, wherein the specification of available QoS in the communication network comprises a specification of at least one of:
  available QoS in a Radio Access Network of the communication network;
  available QoS in a Backhaul Network of the communication network;
  available QoS in a Core Network of the communication network.

6. A method as claimed in claim 1, further comprising:
  generating, from the received QoS intent and the obtained specification of available QoS in the communication network, a network QoS vector that is specific to the received QoS intent;
  and wherein using an ML model to determine, based on the received QoS intent and obtained specifications of available network QoS and QoS policies, at what time the at least one QoS requirement of the QoS intent can be fulfilled for the identified at least one wireless device, comprises inputting the generated network QoS vector to the ML model.

7. A method as claimed in claim 1, wherein the specification of QoS policies in the communication network comprises a set of policy rules currently applied in the network and parameters specified in the policy rules.

8. A method as claimed in claim 1, further comprising:
  generating from the obtained specification of QoS policies in the network, a policy requirements vector indicating network capacity that is required to respect the QoS policies in the network;
  and wherein using the ML model to determine, based on the received QoS intent and obtained specifications of available network QoS and QoS policies, at what time the at least one QoS requirement of the QoS intent can be fulfilled for the identified at least one wireless device, comprises inputting the policy requirements vector to the ML model.

9. A method as claimed in claim 8, wherein generating the policy requirements vector comprises performing at least one of:

generating an aggregated throughput requirement as the sum of Uplink Guaranteed Bit Rate requirements and Downlink Guaranteed Bit Rate requirements for policies in the network;

identifying a maximum policy latency as the maximum value of latency specified in the policies in the network; and calculating an average packet loss from the packet losses specified in the policies in the network;

calculating an average packet jitter from the packet jitters specified in the policies in the network.

10. A method as claimed in claim 9, wherein generating the policy requirements vector further comprises:

checking for an expiry time of a time window during which the received QoS intent is valid;

identifying any policies in the specification of QoS policies in the network that expire before the expiry time of the time window during which the QoS intent is valid; and applying a discount coefficient to the contribution of the identified policies to the aggregated throughput requirement, maximum policy latency, average packet loss, average packet jitter of the policy requirements vector.

11. A method as claimed in claim 1, wherein using the ML model to determine, based on the received QoS intent and obtained specifications of available network QoS and QoS policies, at what time the at least one QoS requirement of the QoS intent can be fulfilled for the identified at least one wireless device comprises:

determining at least one of:

from what time the at least one QoS requirement of the QoS intent can be fulfilled for the identified at least one wireless device;

until what time the at least one QoS requirement of the QoS intent can be fulfilled for the identified at least one wireless device.

12. A method as claimed in claim 11, wherein informing the first node of a result of the determination comprises:

informing the first node of at least one of from when or until when the at least one QoS requirement of the QoS intent can be fulfilled.

13. A method as claimed in claim 1, wherein using the ML model to determine, based on the received QoS intent and obtained specifications of available network QoS and QoS policies, at what time the at least one QoS requirement of the QoS intent can be fulfilled for the identified at least one wireless device comprises at least one of:

classifying the received QoS intent into at least one of a plurality of time windows during which the at least one QoS requirement of the QoS intent can be fulfilled for the identified at least one wireless device; or predicting an earliest time at which the at least one QoS requirement of the QoS intent can be fulfilled for the identified at least one wireless device.

14. A method as claimed in claim 1, wherein using the ML model to determine, based on the received QoS intent and obtained specifications of available network QoS and QoS policies, at what time the at least one QoS requirement of the QoS intent can be fulfilled for the identified at least one wireless device further comprises:

if no policy exists in the candidate set that enables immediate fulfillment of the at least one QoS requirement of the QoS intent:

identifying the earliest time at which any policy in the candidate set is able to fulfil the at least one QoS requirement of the QoS intent;

selecting the policy that enables fulfilment at the earliest time; and determining that the at least one QoS requirement of the QoS intent can be fulfilled from the identified time.

15. A method as claimed in claim 1, wherein using the ML model to determine, based on the received QoS intent and obtained specifications of available network QoS and QoS policies, at what time the at least one QoS requirement of the QoS intent can be fulfilled for the identified at least one wireless device further comprises:

if the candidate set does not contain any policies:

performing at least one of an intent adaptation process or a configuration recommendation process.

16. A method as claimed in claim 15, wherein an intent adaptation process comprises:

generating a plurality of adapted QoS intents, each adapted QoS intent incorporating a change in at least one element of the received QoS intent;

identifying any of the generated adapted QoS intents for which the at least one QoS requirement of the adapted QoS intent could be fulfilled within a threshold time period; and selecting, from the identified adapted QoS intents, the adapted QoS intent having the smallest difference from the received QoS intent according to a difference function.

17. A computer implemented method for managing Quality of Service, QoS, of wireless devices in a communication network, the method, performed by a QoS management node, comprising:

receiving a QoS intent from a first node, the QoS intent comprising:

an identification of at least one wireless device to which the QoS intent applies; and a specification of at least one QoS requirement for the identified wireless device;

obtaining, from a network operations node, a specification of available QoS in the communication network;

obtaining, from a policy control node, a specification of QoS policies in the communication network;

using a Machine Learning, ML, model to determine, based on the received QoS intent and obtained specifications of available network QoS and QoS policies, at what time the at least one QoS requirement of the QoS intent can be fulfilled for the identified at least one wireless device;

informing the first node of a result of the determination; and generating, from the received QoS intent and the obtained specification of available QoS in the communication network, a network QoS vector that is specific to the received QoS intent;

and wherein using an ML model to determine, based on the received QoS intent and obtained specifications of available network QoS and QoS policies, at what time the at least one QoS requirement of the QoS intent can be fulfilled for the identified at least one wireless device, comprises inputting the generated network QoS vector to the ML model;

wherein the communication network comprises a cellular communication network, and wherein generating, from the received QoS intent and the obtained specification of available QoS in the communication network, a network QoS vector that is specific to the received QoS intent comprises:

assembling a cell list from the obtained specification of available QoS in the communication network and the received QoS intent, the cell list comprising identifiers of any cells currently serving at least one wireless device identified in the QoS intent and any cells that are neighbors of cells currently serving at least one wireless device identified in the QoS intent; and for cells in the cell list:

calculating at least one of average throughput capacity, average measure of latency, average measure of packet loss, average measure of packet jitter in the cell;

for Backhaul connections identified as connecting the cell to a Core Network of the communication network, calculating at least one of average throughput capacity, average measure of latency, average measure of packet loss, average measure of packet jitter of the Backhaul connections;

for Core Network paths connecting to the identified Backhaul connections, calculating at least one of average throughput capacity, average measure of latency, average measure of packet loss, average measure of packet jitter of the Core Network paths; and generating a current cell QoS vector comprising at least one of:

the minimum value of the average throughput capacities for the cell, Backhaul connections and Core Network paths;

the sum of the average measure of latency for the cell, Backhaul connections and Core Network paths;

the sum of the average measure of packet loss for the cell, Backhaul connections and Core Network paths;

the sum of the average measure of packet jitter for the cell, Backhaul connections and Core Network paths.

18. A method as claimed in claim 17, wherein generating, from the received QoS intent and the obtained specification of available QoS in the communication network, a network QoS vector that is specific to the received QoS intent comprises:

averaging the values of the elements of the generated current cell QoS vectors across all cells in the assembled cell list.

19. A computer implemented method for managing Quality of Service, QoS, of wireless devices in a communication network, the method, performed by a QoS management node, comprising:

receiving a QoS intent from a first node, the QoS intent comprising:

an identification of at least one wireless device to which the QoS intent applies; and a specification of at least one QoS requirement for the identified wireless device;

obtaining, from a network operations node, a specification of available QoS in the communication network;

obtaining, from a policy control node, a specification of QoS policies in the communication network;

using a Machine Learning, ML, model to determine, based on the received QoS intent and obtained specifications of available network QoS and QoS policies, at what time the at least one QoS requirement of the QoS intent can be fulfilled for the identified at least one wireless device;

informing the first node of a result of the determination; and generating from the obtained specification of QoS policies in the network, a policy requirements vector indicating network capacity that is required to respect the QoS policies in the network;

and wherein using the ML model to determine, based on the received QoS intent and obtained specifications of available network QoS and QoS policies, at what time the at least one QoS requirement of the QoS intent can be fulfilled for the identified at least one wireless device, comprises inputting the policy requirements vector to the ML model;

wherein generating the policy requirements vector comprises performing at least one of:

generating an aggregated throughput requirement as the sum of Uplink Guaranteed Bit Rate requirements and Downlink Guaranteed Bit Rate requirements for policies in the network;

identifying a maximum policy latency as the maximum value of latency specified in the policies in the network;

calculating an average packet loss from the packet losses specified in the policies in the network; and calculating an average packet jitter from the packet jitters specified in the policies in the network;

wherein generating the policy requirements vector further comprises:

checking for priority associated with one or more services to which the policies in the obtained specification apply; and applying a priority coefficient, based on the priority, to the contribution of the identified policies to the aggregated throughput requirement, maximum policy latency, average packet loss, average packet jitter of the policy requirements vector.

* * * * *